US009832641B2

(12) United States Patent
Ando

(10) Patent No.: US 9,832,641 B2
(45) Date of Patent: *Nov. 28, 2017

(54) COMMUNICATION APPARATUS CAPABLE OF ESTABLISHING WIRELESS CONNECTION WITH EXTERNAL APPARATUS

(71) Applicant: Brother Kogyo Kabushiki Kaisha, Nagoya-shi, Aichi-ken (JP)

(72) Inventor: Satoko Ando, Chita (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/494,002

(22) Filed: Sep. 23, 2014

(65) Prior Publication Data

US 2015/0092601 A1   Apr. 2, 2015

(30) Foreign Application Priority Data

Sep. 30, 2013 (JP) .................... 2013-203099

(51) Int. Cl.
*H04W 76/02* (2009.01)
*H04W 12/06* (2009.01)
(Continued)

(52) U.S. Cl.
CPC ......... *H04W 12/06* (2013.01); *H04L 41/0806* (2013.01); *H04W 76/02* (2013.01);
(Continued)

(58) Field of Classification Search
CPC ...................... H04W 76/02–76/028
See application file for complete search history.

(56) References Cited

U.S. PATENT DOCUMENTS 7,174,011 B2 * 2/2007 Kortum ............... H04M 3/523
379/265.02
8,830,971 B1   9/2014 Shipley et al.
(Continued)

FOREIGN PATENT DOCUMENTS

JP  2001-326658 A   11/2001
JP  2004-165953 A   6/2004
JP  2013-162381 A   8/2013

OTHER PUBLICATIONS

"Wi-Fi Peer-to-Peer (P2P) Technical Specification, Version 1.1", Wi-Fi Alliance Technical Committee P2P Task Group, 2010, 159 pages.
(Continued)

*Primary Examiner* — Hoon J Chung
(74) *Attorney, Agent, or Firm* — Banner & Witcoff, Ltd.

(57) ABSTRACT

A communication apparatus may obtain a first wireless connection request from a first external apparatus, determine whether a connection number has reached an upper limit, supply first wait information to the first external apparatus in a case where it is determined that the connection number has reached the upper limit, and newly form a second wireless network which is different from a first wireless network to which both of the communication apparatus and a specific external apparatus had belonged, so as to establish a wireless connection with the first external apparatus, in a case where a wireless connection between the communication apparatus and the specific external apparatus is disconnected after the first wait information is supplied to the first external apparatus. In the first and second wireless networks, the communication apparatus may be configured to operate as a parent station.

19 Claims, 9 Drawing Sheets

(51) Int. Cl.
*H04L 12/24* (2006.01)
*H04W 84/18* (2009.01)
*H04W 76/06* (2009.01)
*G06F 3/12* (2006.01)

(52) U.S. Cl.
CPC .......... *G06F 3/1211* (2013.01); *G06F 3/1236* (2013.01); *G06F 3/1292* (2013.01); *H04W 76/068* (2013.01); *H04W 84/18* (2013.01)

(56) References Cited

U.S. PATENT DOCUMENTS

| | | | | |
|---|---|---|---|---|
| 2005/0064875 A1* | 3/2005 | Gonsalves | ............ | G06Q 30/04 455/454 |
| 2007/0065794 A1* | 3/2007 | Mangum | ................ | G10H 1/365 434/307 A |
| 2008/0250419 A1* | 10/2008 | Kasten | .................... | H04L 67/14 718/104 |
| 2009/0307359 A1* | 12/2009 | Akita | .................... | G06F 3/1213 709/228 |
| 2011/0275316 A1 | 11/2011 | Suumaki et al. | | |
| 2012/0233338 A1 | 9/2012 | Hamachi | | |
| 2012/0278452 A1 | 11/2012 | Schmitz et al. | | |
| 2012/0290730 A1 | 11/2012 | Desai et al. | | |
| 2013/0050259 A1* | 2/2013 | Ahn | ...................... | G06F 3/1454 345/633 |
| 2013/0201525 A1 | 8/2013 | Niwa | | |

OTHER PUBLICATIONS

Sep. 23, 2014—Co-pending U.S. Appl. No. 14/493,872.
Feb. 21, 2017—(JP) Notification of Reasons for Rejection—App 2013-203099, Eng Tran.
Feb, 21, 2017—(JP) Notification of Reason for Rejection—App 2013-203100, Eng Tran.
Apr. 7, 2017—U.S. Non-final Office Action—U.S. Appl. No. 14/493,872.
Oct. 6, 2017—(U.S.) Final Office Action—U.S. Appl. No. 14/493,872.

* cited by examiner

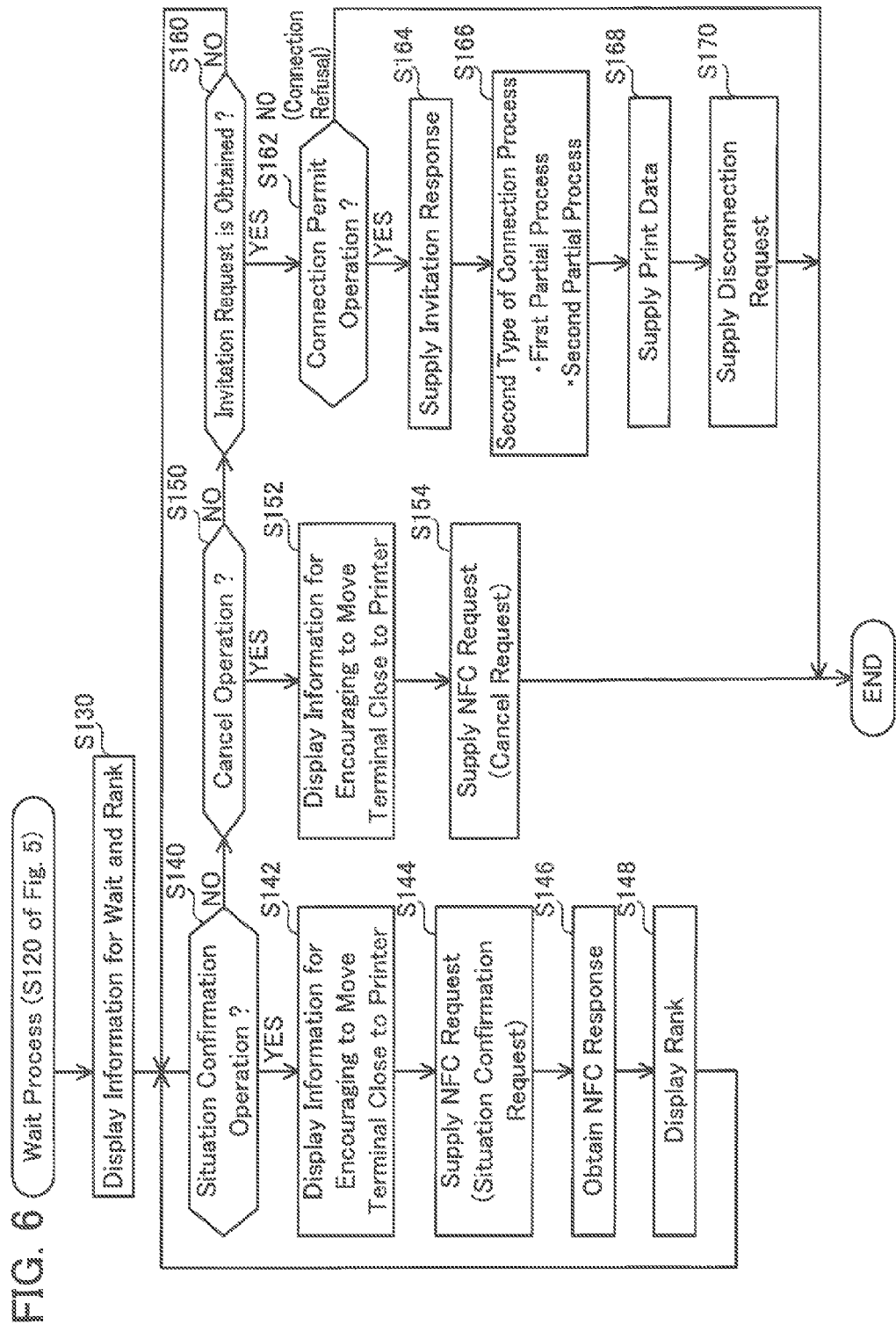

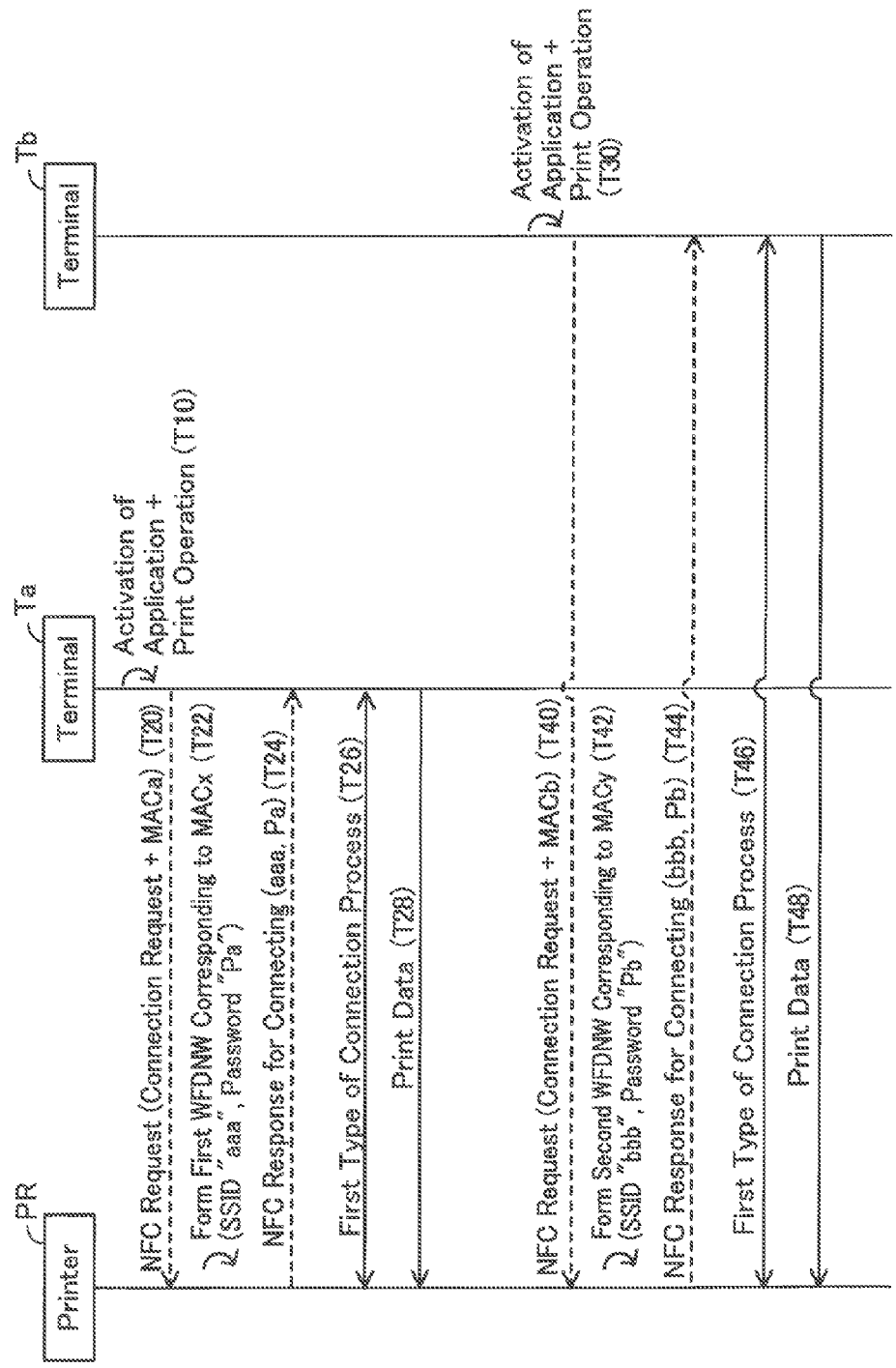

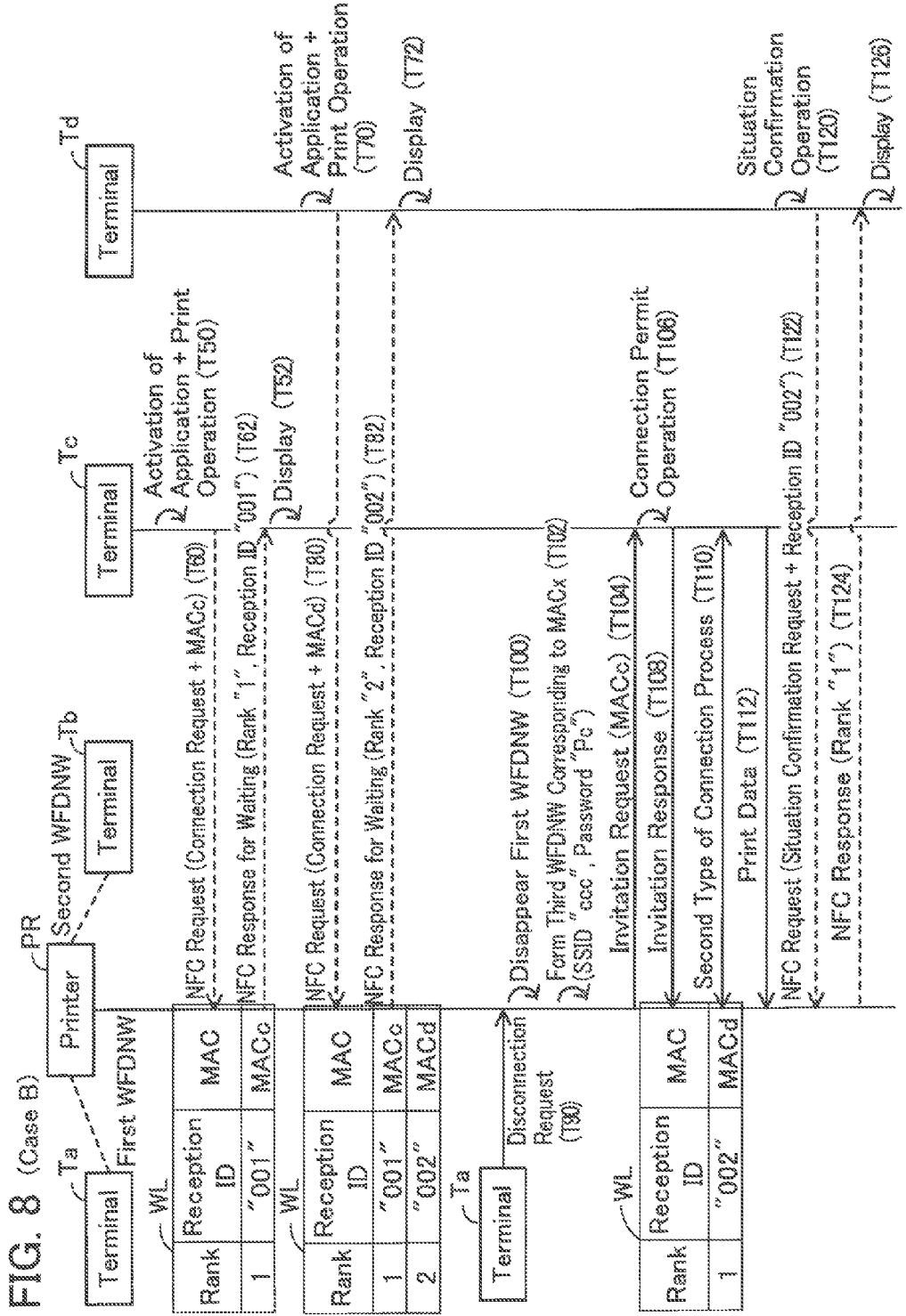

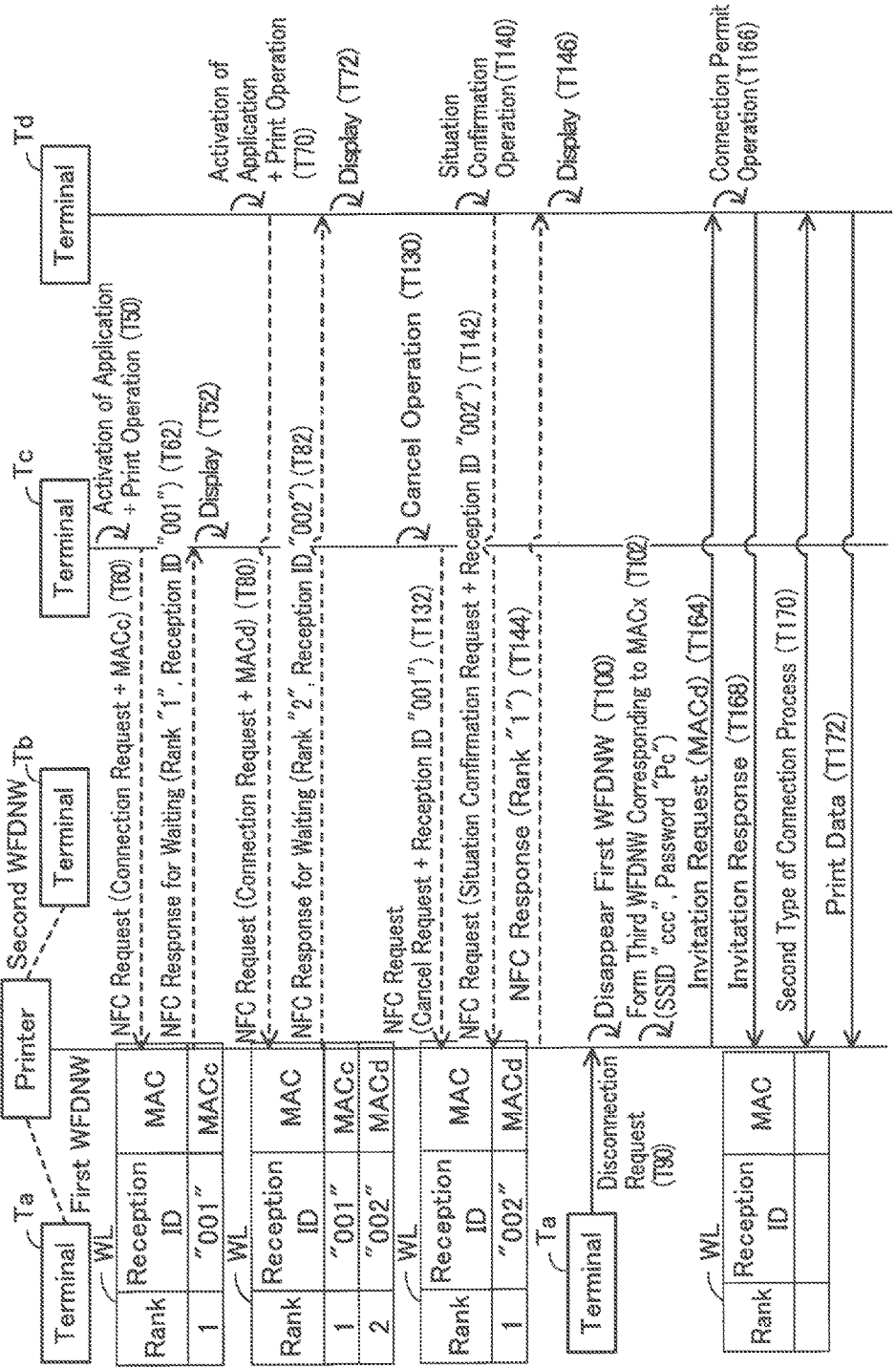

COMMUNICATION APPARATUS CAPABLE OF ESTABLISHING WIRELESS CONNECTION WITH EXTERNAL APPARATUS

CROSS-REFERENCE TO RELATED APPLICATIONS

This application claims priority to Japanese Patent Application No. 2013-203099, filed on Sep. 30, 2013, the contents of which are hereby incorporated by reference into the present application.

TECHNICAL FIELD

This specification discloses a communication apparatus which can operate as a parent station of a wireless network.

DESCRIPTION OF RELATED ART

In the Wi-Fi Direct method formulated by the Wi-Fi Alliance, an apparatus in a Group Owner state (hereinafter referred to as a "G/O apparatus") forms a wireless network. In the G/O apparatus, an upper limit of a number of a wireless connection (hereinafter referred to as a "connection number") which can be simultaneously established by the G/O apparatus itself is usually determined in advance. Therefore, if the G/O apparatus obtains a wireless connection request from another apparatus in a state where the connection number has reached the upper limit, it is difficult to newly establish a wireless connection with the another apparatus and thus, it is usually difficult to perform a wireless communication with the another apparatus.

SUMMARY

In the present specification, a technique is provided that a communication apparatus appropriately performs a wireless communication with an external apparatus in a case where the communication apparatus obtains a wireless connection request from the external apparatus in a state where a number of a wireless connection being currently established by the communication apparatus operating as a parent station of a wireless network has reached an upper limit.

A communication apparatus may comprise: a processor; and a memory storing computer-readable instructions therein. The computer-readable instructions, when executed by the processor, may cause the communication apparatus to: obtain a first wireless connection request from a first external apparatus; determine whether a connection number has reached an upper limit in a case where the first wireless connection request is obtained from the first external apparatus, the connection number being a total number of a wireless connection which has been currently established by the communication apparatus; supply first wait information to the first external apparatus in a case where the first wireless connection request is obtained from the first external apparatus and it is determined that the connection number has reached the upper limit, the first wait information being for causing the first external apparatus to wait until when a situation is realized where the communication apparatus is capable of establishing a wireless connection with the first external apparatus; and newly form a second wireless network which is different from a first wireless network to which both of the communication apparatus and a specific external apparatus had belonged, so as to establish a wireless connection with the first external apparatus, in a case where a wireless connection between the communication apparatus and the specific external apparatus is disconnected after the first wait information is supplied to the first external apparatus, wherein in the first wireless network, the communication apparatus is configured to operate as a parent station and the specific external apparatus is configured to operate as a child station, and in the second wireless network, the communication apparatus is configured to operate as a parent station and the first external apparatus is configured to operate as a child station.

A control method, computer-readable instructions, and a non-transitory computer-readable medium storing the computer-readable instructions for realizing the above communication apparatus are also new and useful. A method performed by the above communication apparatus is also new and useful. Moreover, a system comprising the above communication apparatus and any of the above external apparatuses (for example, a specific external apparatus, a first external apparatus, and a second external apparatus) is also new and useful.

BRIEF DESCRIPTION OF THE DRAWINGS

FIG. 6 illustrates a flowchart of a wait process of the terminal.

FIG. 7 illustrates a sequence chart of a case A in which the printer forms two WFDNWs.

FIG. 8 illustrates a sequence chart of a case B in which the printer causes two terminals to wait.

FIG. 9 illustrates a sequence chart of a case C in which the printer causes the two terminals to wait.

EMBODIMENT (Configuration of System; FIG. 1)

As illustrated in FIG. 1, a communication system 2 of this embodiment includes a printer PR and a plurality of terminals Ta to Td, Each of the printer PR and the terminals Ta to Td is capable of performing each of an NFC communication which is a wireless communication according to an NFC (abbreviation of Near Field Communication) method and a Wi-Fi communication which is a wireless communication according to a Wi-Fi method formulated by the Wi-Fi Alliance.

(Configuration of Printer PR)

Figure 1:
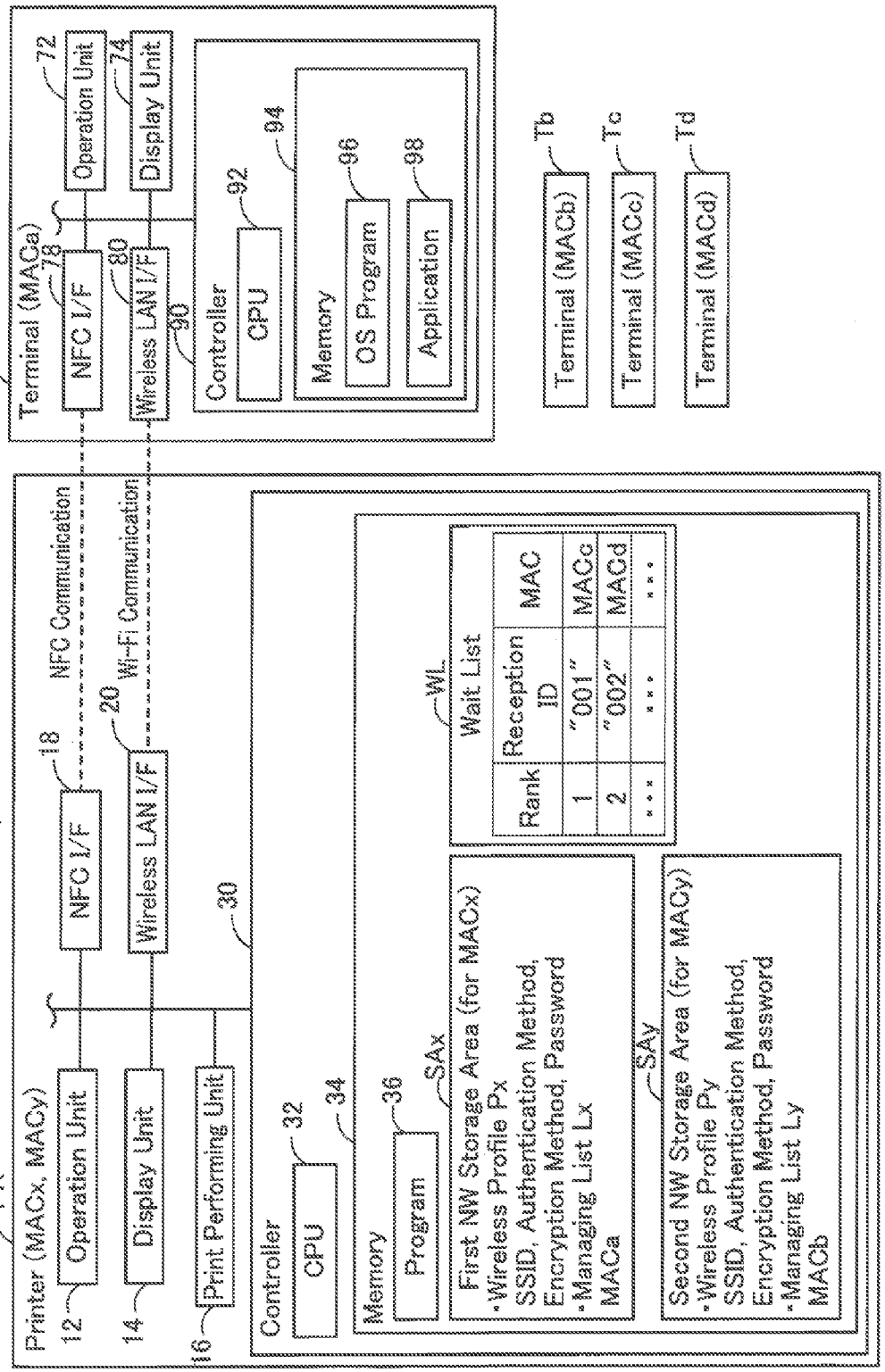
FIG. 1 illustrates a configuration of a communication system.

The printer PR is a peripheral apparatus (that is, a peripheral equipment of a PC (abbreviation of Personal Computer) and the like) capable of executing a printing function. The printer PR includes an operation unit 12, a display unit 14, a print performing unit 16, an NFC interface 18, a wireless LAN (abbreviation of Local Area Network) interface 20, and a controller 30. Each of the units 12 to 30 is connected to a bus line (reference numeral omitted). In the following, the interface will be described as "I/F".

The operating unit 12 comprises a plurality of keys. A user can input various instructions to the printer PR by operating the operating unit 12. The display unit 14 is a display for displaying various kinds of information. The print performing unit 16 is a printing mechanism such as an inkjet-type, a laser type and the like.

The NFC I/F 18 is an I/F for performing the NFC communication according to the NFC method. The NFC method is a wireless communication method for performing a wireless communication in conformity to, for example, the international standards of ISO/IEC21481 or 18092.

The wireless LAN I/F 20 is an interface for performing the Wi-Fi communication according to the Wi-Fi method. The Wi-Fi method is, for example, a wireless communication method for performing a wireless communication in conformity to the standard of IEEE (abbreviation of the Institute of Electrical and Electronics Engineers, Inc.) 802.11 and the standards (802.11a, 11b, 11g, 11n and the like, for example) corresponding to IEEE 802.11. More specifically, the wireless LAN I/F 20 is an I/F supporting the WFD (abbreviation of Wi-Fi Direct) method formulated by the Wi-Fi Alliance. Therefore, the controller 30 can perform the Wi-Fi communication via the wireless LAN I/F 20 by using a wireless network of the WFD method (hereinafter referred to as "WFDNW").

The wireless LAN I/F 20 is physically a single interface (that is, a single IC chip). However, two MAC addresses (hereinafter referred to as "MACx" and "MACy") are allocated in advance to the wireless LAN I/F 20. Therefore, the controller 30 is capable of simultaneously performing both the Wi-Fi communication using MACx and the Wi-Fi communication using MACy.

The NFC I/F 18 and the wireless LAN I/F 20 are different from each other in the following points. A communication speed of the wireless communication via the wireless LAN I/F 20 (the maximum communication speed is 11 to 600 Mbps, for example) is faster than the communication speed of the wireless communication via the NFC I/F 18 (the maximum communication speed is 100 to 424 Kbps, for example). Moreover, a frequency of a carrier wave in the wireless communication via the wireless LAN I/F 20 (2.4 GHz band, 5.0 GHz band, for example) is different from the frequency of the carrier wave in the wireless communication via the NFC I/F 18 (13.56 MHz band, for example). Moreover, a maximum distance for which the printer PR can perform the wireless communication with an external apparatus via the wireless LAN I/F 20 (100 m at the maximum, for example) is larger than the maximum distance for which the printer PR can perform the wireless communication with the external apparatus via the NFC I/F 18 (10 cm at the maximum, for example).

The controller 30 comprises a CPU 32 and a memory 34. The CPU 32 is a processor for executing various processes in accordance with a program 36 stored in the memory 34. The memory 34 comprises a first NW storage area SAx, a second NW storage area SAy, and a wait list WL.

The first NW storage area SAx stores information relating to a WFDNW in which MACx is used as a MAC address of the printer PR. Hereinafter, this WFDNW is referred to as "WFDNW corresponding to MACx". The second NW storage area SAy stores information relating to a WFDNW in which MACy is used as a MAC address of the printer PR. Hereinafter, this WFDNW is referred to as "WFDNW corresponding to MACy". The printer PR operates as a parent station (that is, a Group Owner of the WFD method) both in the WFDNW corresponding to MACx and the WFDNW corresponding to MACy. The printer PR can construct a state where the two WFDNW in which the printer PR itself operates as the parent station are present at the same time.

The first NW storage area SAx stores a wireless profile Px and a managing list Lx when the WFDNW corresponding to MACx is present. The wireless profile Px and the managing list Lx are registered in the first NW storage area SAx when a wireless connection with any of the terminals is established and is deleted from the first NW storage area SAx when the wireless connection is disconnected. The wireless profile Px is wireless setting information used in the WFDNW corresponding to MACx and includes an SSID (abbreviation of Service Set IDentifier), an authentication method, an encryption method, and a password. The SSID is an identifier for identifying the WFDNW corresponding to MACx. The authentication method, the encryption method, and the password are information used in authentication and encryption executed in the WFDNW corresponding to MACx.

In the managing list Lx, the MAC address of an apparatus operating as a child station of the WFDNW corresponding to MACx is described. That is, in the managing list Lx, the MAC address of the apparatus with which a wireless connection is established with the printer PR operating as a parent station of the WFDNW corresponding to MACx is described. In this embodiment, the maximum number of a wireless connection (hereinafter referred to as the "maximum number corresponding to MACx") that can be established by the printer PR operating as the parent station of the WFDNW corresponding to MACx is "1". Therefore, in the managing list Lx, one MAC address at the maximum is described.

The second NW storage area SAy stores a wireless profile Py and a managing list Ly when the WFDNW corresponding to MACy is present. The wireless profile Py and the managing list Ly are registered in the second NW storage area SAy when a wireless connection with any of the terminals is established and is deleted from the second NW storage area SAy when the wireless connection is disconnected. The wireless profile Py and the managing list Ly are similar to the wireless profile Px and the managing list Ly, respectively, except the point that they are information relating to the WFDNW corresponding to MACy. The maximum number of a wireless connection (hereinafter referred to as the "maximum number corresponding to MACy") that can be established by the printer PR operating as the parent station of the WFDNW corresponding to MACy is "1". Therefore, in the managing list Lx, one MAC address at the maximum is described.

As described above, in the printer PR, the state in which both the WFDNW corresponding to MACx and the WFDNW corresponding to MACy are present at the same time can be constructed, and moreover, the maximum number corresponding to MACx and the maximum number corresponding to MACy are "1", respectively. Therefore, the total number of wireless connections that can be established by the printer PR at the same time, that is, an upper limit of wireless connections that can be established by the printer PR is "2".

In the wait list WL, one or more pieces of terminal information relating to one or more wait terminals may be described. The wait terminal is a terminal which waits, after supplying a connection request to the printer PR, until when a situation is realized where the printer PR is capable of establishing a wireless connection with the wait terminal. The terminal information includes a rank, a reception ID, and a MAC address. The rank indicates a priority rank of a connection of the wait terminal (that is, a connection rank). The higher the rank of the wait terminal is (that is, the smaller the numeral indicated by the rank is), the earlier the wireless connection with the printer PR can be established. The reception ID is a unique ID generated when the printer PR causes the terminal to wait. The MAC address is the MAC address of the wait terminal.

(Configuration of Terminals Ta to Td)

Each of the terminals Ta to Td is a portable terminal apparatus such as a mobile phone (a smart phone, for example), a PDA (abbreviation of Personal Digital Assistant), a note PC, a tablet PC, a portable music reproducing apparatus, a portable video reproducing apparatus, and the like. One MAC address is allocated to each of the terminals Ta to Td. Each of the MAC addresses of the terminals Ta to Td is described as "MACa", "MACb", "MACc", and "MACd".

A configuration of the terminal Ta will be explained. The terminals Tb to Tc have the same configurations as that of the terminal Ta. The terminal Ta includes an operating unit 72, a display unit 74, an NFC I/F 78, a wireless LAN IN 80, and a controller 90. Each of the units 72 to 90 is connected to a bus line (not shown).

The operating unit 72 comprises a plurality of keys. The user can give various instructions to the terminal Ta by operating the operating unit 72. The display unit 74 is a display for displaying various kinds of information. The NFC I/F 78 and the wireless LAN I/F 80 are similar to the NFC I/F 18 and the wireless LAN I/F 20 of the printer PR, respectively. Therefore, the terminal Ta can perform the NFC communication and the Wi-Fi communication.

The controller 90 comprises a CPU 92 and a memory 94. The CPU 92 is a processor for executing various processes in accordance with each of programs 96 and 98 stored in the memory 94.

The OS (abbreviation of Operation System) program 96 is a program for realizing basic operation of the terminal Ta. The application 98 is a program for causing the printer PR to perform printing. The application 98 is an application provided by a vendor of the printer PR and it may be installed in the terminal Ta from a server on the Internet or may be installed in the terminal Ta from a medium shipped with the printer PR.

(WFD (Abbreviation of Wi-Fi Direct) Method)

The WFD method is a wireless communication method described in "Wi-Fi Peer-to-Peer (P2P) Technical Specification Version 1.1" which is a standard formulated by the Wi-Fi Alliance.

An apparatus which supports the WFD method such as the printer PR and each of the terminals Ta to Td will be referred to as "WFD apparatuses" below. In the above-described WFD standard, three states, that is, a Group Owner state (referred to as "(G/O state" below), a client state (referred to as "CL state" below), and a device state are defined as the states of the WFD apparatus. The WFD apparatus can selectively operate in one of the above three states.

A WFD apparatus in the G/O state (that is, the G/O apparatus) is an apparatus forming a wireless network (that is, WFDNW) in which this WFD apparatus operates as a parent station. A WFD apparatus in the CL state (that is, the CL apparatus) is an apparatus operating as a child station of the WFDNW. A WFD apparatus in the device state (that is, the device apparatus) is an apparatus not belonging to the WFDNW.

A WFDNW to which both the G/O apparatus and the CL apparatus belong is formed by either of the following two procedures, for example. In a first procedure, a pair of device apparatuses performs a wireless communication called G/O negotiation. As a result, one of the pair of device apparatuses is determined to become the G/O state (that is, the G/O apparatus), while the other is determined to become the CL state (that is, the CL apparatus). Then, the G/O apparatus forms the WFDNW and establishes a wireless connection with the CL apparatus. As a result, the WFDNW to which both the G/O apparatus and the CL apparatus belong is formed. In a second procedure, the device apparatus does not execute the G/O negotiation but spontaneously proceeds to the G/O state and forms the WFDNW. In this case, after the WFDNW is formed, another device apparatus proceeds to the CL state without executing the G/O negotiation and establishes a wireless connection with the G/O apparatus. As a result, the WFDNW to which both the G/O apparatus and the CL apparatus belong is formed.

The G/O apparatus can perform a wireless communication of target data with the CL apparatus not via another apparatus. The target data is data including information of a network layer of an OSI reference model and information of a layer higher than the network layer (an application layer, for example), and the target data includes print data representing an image of a printing target, for example. Moreover, the G/O apparatus can relay a wireless communication of the target data between the pair of CL apparatuses. As described above, in the WFDNW, each of the apparatuses can perform the wireless communication of the target data not via an access point (hereinafter referred to as "AP") constituted separately from each of the apparatuses. That is, the WFD method can be considered as a wireless communication method not using AP.

Moreover, although the G/O apparatus cannot perform a wireless communication of the target data with the device apparatus not belonging to the WFDNW, the G/O apparatus can establish a wireless connection with the device apparatus by performing a wireless communication of connection data with the device apparatus. As a result, the G/O apparatus can cause the device apparatus to participate in the WFDNW.

The G/O apparatus can also establish a wireless connection with a legacy apparatus by performing a wireless communication of connection data with the legacy apparatus not belonging to the WFDNW. As a result, the G/O apparatus can cause the legacy apparatus to participate in the WFDNW. The legacy apparatus does not support the WFD method but it is an apparatus capable of establishing a wireless connection with for example an AP in accordance with the Wi-Fi method.

The above connection data is data including information of a layer lower than the network layer (a physical layer, a data link layer and the like, for example) of the OSI reference model (that is, data not including the information of the network layer). More specifically, the above connection data is classified into either of WFD connection data including specific data which is specific to the WFD method and normal connection data not including the specific data.

The normal connection data includes Probe Request/ Response, Authentication Request/Response, Association Request/Response, WSC Exchange, 4-Way Handshake and the like, for example. The Probe Request is a signal for searching an apparatus operating as a parent station of the wireless network (G/O apparatus or AP, for example), and the Probe Response is its response signal. The Authentication Request is a signal for confirming an authentication method, and the Authentication Response is its response signal. The Association Request is a signal for requesting a connection, and the Association Response is its response signal. The WSC Exchange is a signal for supplying various types of information such as a password and the like. The 4-Way Handshake is a signal for executing authentication.

In addition to the above normal connection data, the WFD connection data. further includes Invitation Request/Response, Provision Discovery Request/Response and the like, for example, as the specific data which is specific to the WFD method. The Invitation Request is a signal for instructing participation in the WFDNW, and the Invitation Response is its response signal. The Provision Discovery Request is a signal for confirming a method (push-button method, PIN code method and the like, for example) of WPS (abbreviation of Wi-Fi Protected Setup), and the Provision Discovery Response is its response signal.

In general, the normal connection data is data used by the legacy apparatus for establishing a wireless connection with AP. That is, the legacy apparatus can establish a wireless connection with the AP by performing a wireless communication of the normal connection data with the AP and participate as a so-called "station" in the wireless network formed by the AP. Similarly, the legacy apparatus can establish a wireless connection with the G/O apparatus by performing the wireless communication of the normal connection data with the G/O apparatus and participate in the WFDNW as a station.

The device apparatus (that is, the apparatus supporting the WFD method) can establish a wireless connection with the G/O apparatus and participate in the WFDNW by performing a wireless connection of either of the normal connection data and the WFD connection data with the G/O apparatus depending on the situation. If the device apparatus performs a wireless communication only of the normal connection data, the device apparatus can be considered to participate in the WFDNW as a station. That is because the device apparatus does not perform a wireless communication of the specific data which is specific to the WFD method. On the other hand, if the device apparatus performs a wireless communication of the WFD connection data, the device apparatus can be considered to participate in the WFDNW as a CL apparatus.

As described above, the device apparatus can participate in the WFDNW as a station or can participate in the WFDNW as a CL apparatus. However, below, the station and the CL apparatus are not discriminated but both are referred to as a "child station".

Figure 2:
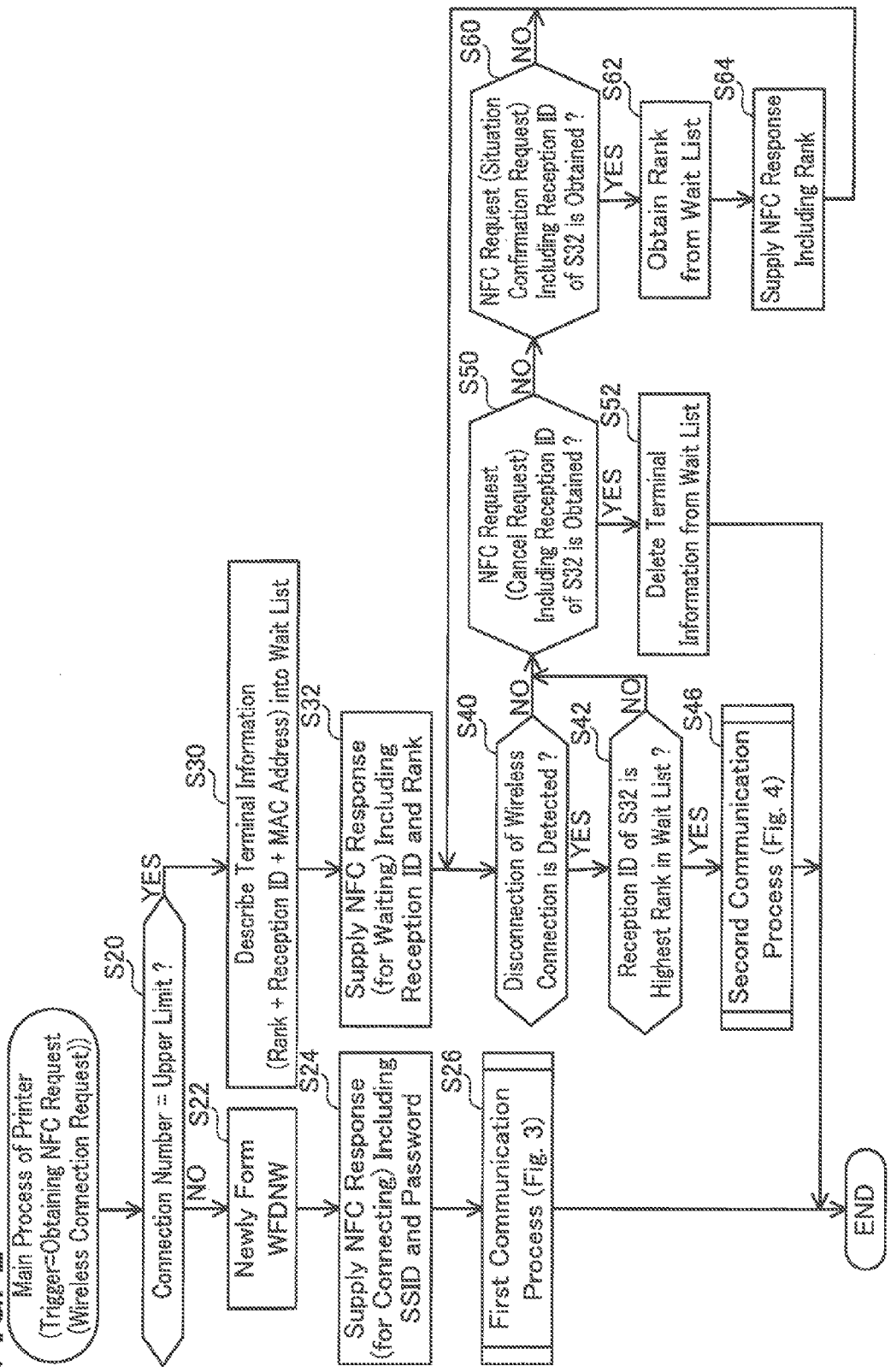
FIG. 2 illustrates a flowchart of a main process of a printer.

(Main Process of Printer PR; FIG. 2)

Contents of the main process executed by the CPU 32 of the printer PR will be explained by referring to FIG. 2. The main process in FIG. 2 is started by using obtainment of an NFC request including a connection request from a terminal (the terminal Ta, for example) as a trigger. In the following, a terminal which is a supply source of the NFC request, which is a start trigger of the main process in FIG. 2, would be referred to as an "object terminal".

If the user of the object terminal wants to cause the printer PR to perform printing, the user performs in the object terminal an operation of activating the application 98 (see FIG. 1) for the printer PR and an operation for instructing performance of printing. Subsequently, the user moves the object terminal close to the printer PR. When a distance between the NFC I/F of the object terminal and the NFC I/F 18 of the printer PR becomes less than a distance (10 cm, for example) capable of performing the NFC communication, the NFC connection is established between these NFC I/Fs. In this case, the object terminal supplies an NFC request including the connection request and the MAC address of the object terminal itself (MACa, for example) to the printer PR by using the NFC connection.

In a case where the NFC request including the connection request is obtained from the object terminal via the NFC I/F 18, the CPU 32 starts the main process in FIG. 2. In a case where the NFC request is further obtained from another terminal while the CPU 32 is executing the main process caused by obtainment of the NFC request from any of the terminals, the CPU 32 starts the main process as another process. That is, in a case where a plurality of the NFC requests is simultaneously obtained from a plurality of the terminals, the CPU 32 executes a plurality of main processes in accordance with the plurality of NFC requests in parallel.

At S20, the CPU 32 determines whether or not the total number of wireless connection (hereinafter referred to as "connection number") currently established by the printer PR has reached the upper limit "2". Specifically, the CPU 32 determines that the connection number has reached the upper limit (Yes at S20) so as to proceed to S30, if information relating to the wireless network (that is, the wireless profiles Px and Py and the managing lists Lx and Ly) is stored in each of the first and second NW storage areas SAx and SAy (see FIG. 1) in the memory 34. Moreover, if the information relating to the wireless network is not stored in at least one of the first and second NW storage areas SAx and SAy, the CPU 32 determines that the connection number has not reached the upper limit (NO at S20) so as to proceed to S22.

At S22, the CPU 32 newly forms the WFDNW in which the printer PR operates as the G/O apparatus. The CPU 32 forms the WFDNW corresponding to MACx if neither the WFDNW corresponding to MACx nor the WFDNW corresponding to MACy is present. Moreover, if only one of the WFDNW corresponding to MACx and the WFDNW corresponding to MACy is present, the CPU 32 forms the other WFDNW.

Specifically, at S22, the CPU 32 becomes the G/O apparatus of the WFDNW corresponding to MACx or MACy without executing G/O negotiation and prepares the wireless profile to be used in the WFDNW (that is, the SSID, the authentication method, the encryption method, and the password). The CPU 32 generates a unique SSID having not been generated before. The CPU 32 generates the unique SSID by incrementing a numeral included in the latest SSID generated before, for example. Moreover, the CPU 32 generates the password by selecting a character string at random, for example. Then, the CPU 32 prepares the authentication method and the encryption method determined in advance.

When the WFDNW corresponding to MACx should be formed, the CPU 32 stores the prepared wireless profile Px and the managing list Lx in the first NW storage area SAx. Alternatively, if the WFDNW corresponding to MACy should be formed, the CPU 32 stores the prepared wireless profile Py and the managing list Ly in the second NW storage area SAy. In this stage, a MAC address is not described yet in the managing list Lx or the managing list Ly.

As described above, at S22, the printer PR does not re-use an old wireless profile having been used in the past WFDNW but prepares a new wireless profile including a new SSID and password. Thus, it is capable of inhibiting that a terminal different from the object terminal participates in the WFDNW formed at S22 by re-establishing the wireless connection with the printer PR by using the old wireless profile. Therefore, the printer PR can appropriately establish the wireless connection with the object terminal by using the new wireless profile.

At S24, the CPU 32 supplies an NFC response including the SSID and the password generated at S22 to the object terminal via the NFC I/F 18. As a result, the CPU 32 can notify the object terminal that the wireless connection with the printer PR should be established by using the SSID and the password. It should be noted that the NFC response supplied at S24 will be referred to as a "NFC response for connecting" hereinafter.

At S26, the CPU 32 executes a first communication process which will be described later (see FIG. 3), so as to establish a wireless connection with the object terminal. As a result, the CPU 32 causes the object terminal to participate as a child station in the WFDNW formed at S22 and obtains print data from the object terminal. When S26 is finished, the process in FIG. 2 is finished.

On the other hand, at S30 (that is, if the connection number has reached the upper limit), the CPU 32 prepares terminal information (that is, the rank, the reception ID, and the MAC address) so as to describe the terminal information in the wait list WL (see FIG. 1) in the memory 34. Specifically, the CPU 32 determines the rank by incrementing "1" to the lowest rank (that is, the rank indicating the largest numeral) currently described in the wait list WL. The CPU 32 generates the unique reception ID by incrementing the numeral included in the latest reception ID generated before, for example. The CPU 32 extracts the MAC address of the object terminal from the obtained NFC request Which is the trigger for starting the process in FIG. 2. Then, the CPU 32 describes the terminal information including the determined rank, the generated reception ID, and the extracted MAC address in the wait list WL.

At S32, the CPU 32 supplies the NFC response including the rank and the reception ID described at S30 to the object terminal via the NEC I/F 18. The NFC response does not include an SSID or a password unlike the NFC response at S24, As a result, the CPU 32 can notify the object terminal that it should wait until a situation is realized where the printer PR is capable of establishing a wireless connection with the object terminal. It should be noted that the NFC response supplied at S32 will be referred to as an "NFC response for waiting", and the reception ID supplied to the object terminal at S32 as an "object reception ID" hereinafter. Subsequently, the CPU 32 sequentially executes monitoring processes at S40, S50, and S60.

At S40, the CPU 32 monitors disconnection of any of the wireless connection currently established by the printer PR. If the wireless profile and the managing list are deleted from either of the first and second NW storage areas SAx and SAy in the memory 34, the CPU 32 determines that the wireless connection is disconnected (YES at S40) so as to proceed to S42.

At S42, the CPU 32 refers to the wait list WL in the memory 34 and determines whether or not the object reception ID is associated with the highest rank "1" in the wait list WL. If the CPU 32 determines that the object reception ID is associated with the highest rank (YES at S42), the CPU 32 proceeds to S46. If the CPU 32 determines that the object reception ID is not associated with the highest rank (NO at S42), the CPU 32 proceeds to the monitoring process at S50 and S60 without executing S46.

At S46, the CPU 32 executes a second communication process which will be described later (see FIG. 4), so as to establish a wireless connection with the object terminal. As a result, the CPU 32 may cause the object terminal to participate as a child station in the WFDNW formed at S80 in FIG. 4 which will be described later and obtain print data from the object terminal. When S46 is finished, the process in FIG. 2 is finished.

At S50, the CPU 32 monitors obtainment of the NFC request including the object reception ID and a cancel request from the object terminal via the NFC I/F 18. If the NFC request is to be obtained (YES at S50), the CPU 32 proceeds to S52.

At S52, the CPU 32 deletes the terminal information including the object reception ID (that is, the rank, the object reception ID, the MAC address of the object terminal) from the wait list WL (see FIG. 1). If there are one or more pieces of terminal information including the ranks lower than that of the deleted terminal information in the wait list WL, the CPU 32 moves up each of the ranks included in the one or more pieces of terminal information. When S52 is finished, the process in FIG. 2 is finished.

At S60, the CPU 32 monitors obtainment of the NFC request including the object reception ID and a situation confirmation request from the object terminal via the NFC I/F 18. In a case where the NFC request is obtained (YES at S60), the CPU 32 proceeds to S62.

At S62, the CPU 32 obtains the rank associated with the object reception ID from wait list WL (see FIG. 1).

Subsequently, at S64, the CPU 32 supplies the NFC response including the obtained rank to the object terminal via the NFC I/F 18. When S64 is finished, the CPU 32 returns to the monitoring process at S40.

Figure 3:
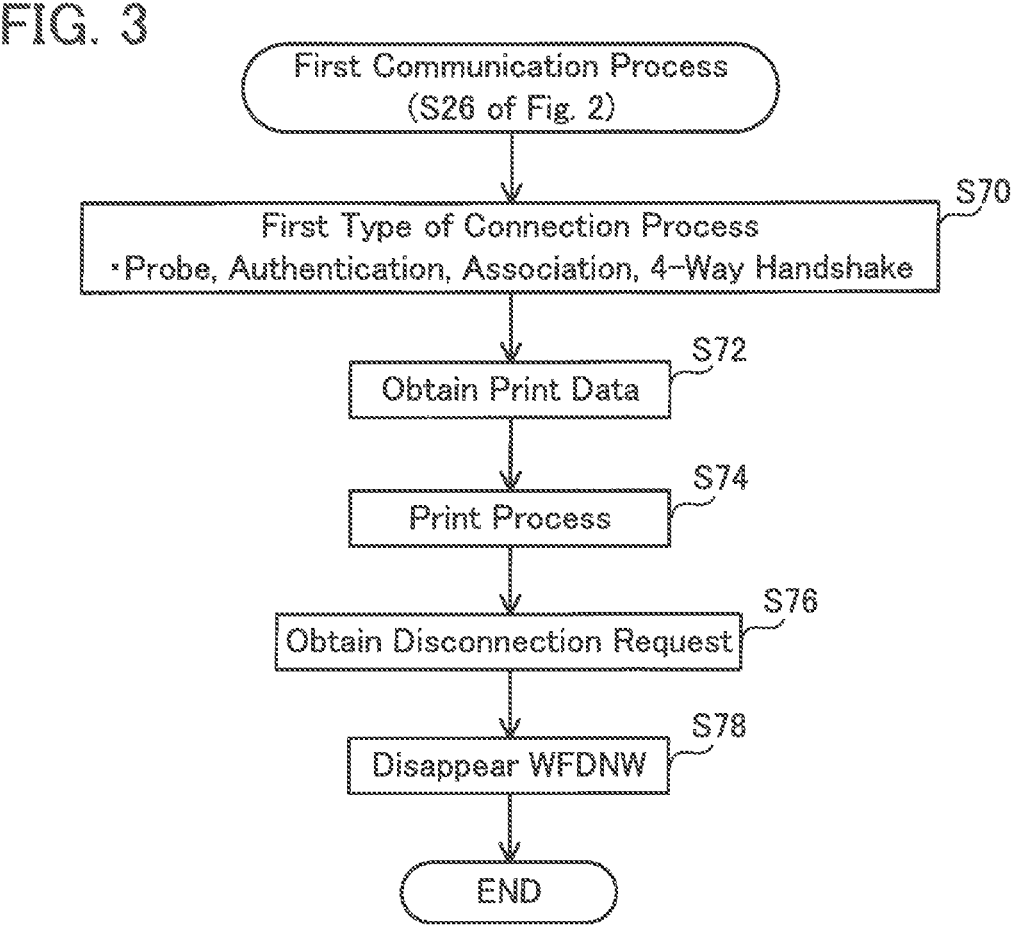
FIG. 3 illustrates a flowchart of a first communication process of the printer.

(First Communication Process; FIG. 3)

Contents of the first communication process executed at S26 in FIG. 2 will be explained by referring to FIG. 3. In the first communication process, the CPU 32 executes each of the following communication (S70, S72 and the like) by using the MAC address (that is, MACx or MACy) corresponding to the WFDNW formed at S22 in FIG. 2 (hereinafter simply referred to as "WFDNW of S22") as the MAC address of the printer PR. That is, each signal supplied to the object terminal from the printer PR includes the MAC address corresponding to the WFDNW of S22 as the MAC address of a supply source. Each signal supplied from the object terminal to the printer PR includes the MAC address of the object terminal as the MAC address of the supply source.

At S70, the CPU 32 executes a first type of a connection process with the object terminal via the wireless LAN I/F 20 so as to establish a wireless connection with the object terminal. Specifically, the CPU 32 obtains the Probe Request from the object terminal and supplies the Probe Response to the object terminal. The Probe Request includes the SSID supplied to the object terminal at S24 in FIG. 2. The Probe Response includes the authentication method and the encryption method stored in the memory 34 at S22 in FIG. 2. As a result, notification can be made to the object terminal that the authentication method and the encryption method should be used. Subsequently, the CPU 32 sequentially obtains the Authentication Request and the Association Request from the object terminal and sequentially supplies the Authentication Response and the Association Response to the object terminal. Then, the CPU 32 executes the 4-way handshake with the object terminal.

When the first type of connection process at S70 is finished, the wireless connection with the object terminal is established. As a result, the CPU 32 can cause the object terminal to participate in the WFDNW of S22 as a child station (more specifically, as a station). Then, the CPU 32 describes the MAC address of the object terminal included in each signal obtained in the first type of connection process in the managing list stored at S22 in FIG. 2 (that is, the managing list Lx or Ly in FIG. 1).

At S72, the CPU 32 obtains the print data from the object terminal via the wireless LAN I/F 20 by using the WFDNW of S22.

At S74, the CPU 32 supplies the obtained print data to the print performing unit 16 (see FIG. 1). As a result, the print performing unit 16 prints an image represented by the obtained print data on a print medium.

At S76, the CPU 32 obtains a disconnection request from the object terminal via the wireless LAN I/F 20. The disconnection request is a signal for requesting disconnection of the wireless connection and includes the MAC address corresponding to the WFDNW of S22 as the MAC address of the supply destination. Therefore, if there are two WFDNW, the CPU 32 can know that the WFDNW of S22 should be made to disappear on the basis of the MAC address of the supply destination included in the disconnection request.

At S78, the CPU 32 disconnects the wireless connection with the object terminal and causes the WFDNW of S22 to disappear. Specifically, the CPU 32 first supplies the response signal to the disconnection request to the object terminal via the wireless LAN I/F 20, so as to disconnect the wireless connection with the object terminal. Subsequently, the CPU 32 deletes from the memory 34 the wireless profile and the managing list described in the memory 34 at S22 in FIG. 2. As a result, the WFDNW of S22 disappears. When S78 is finished, the process in FIG. 3 is finished.

Figure 4:
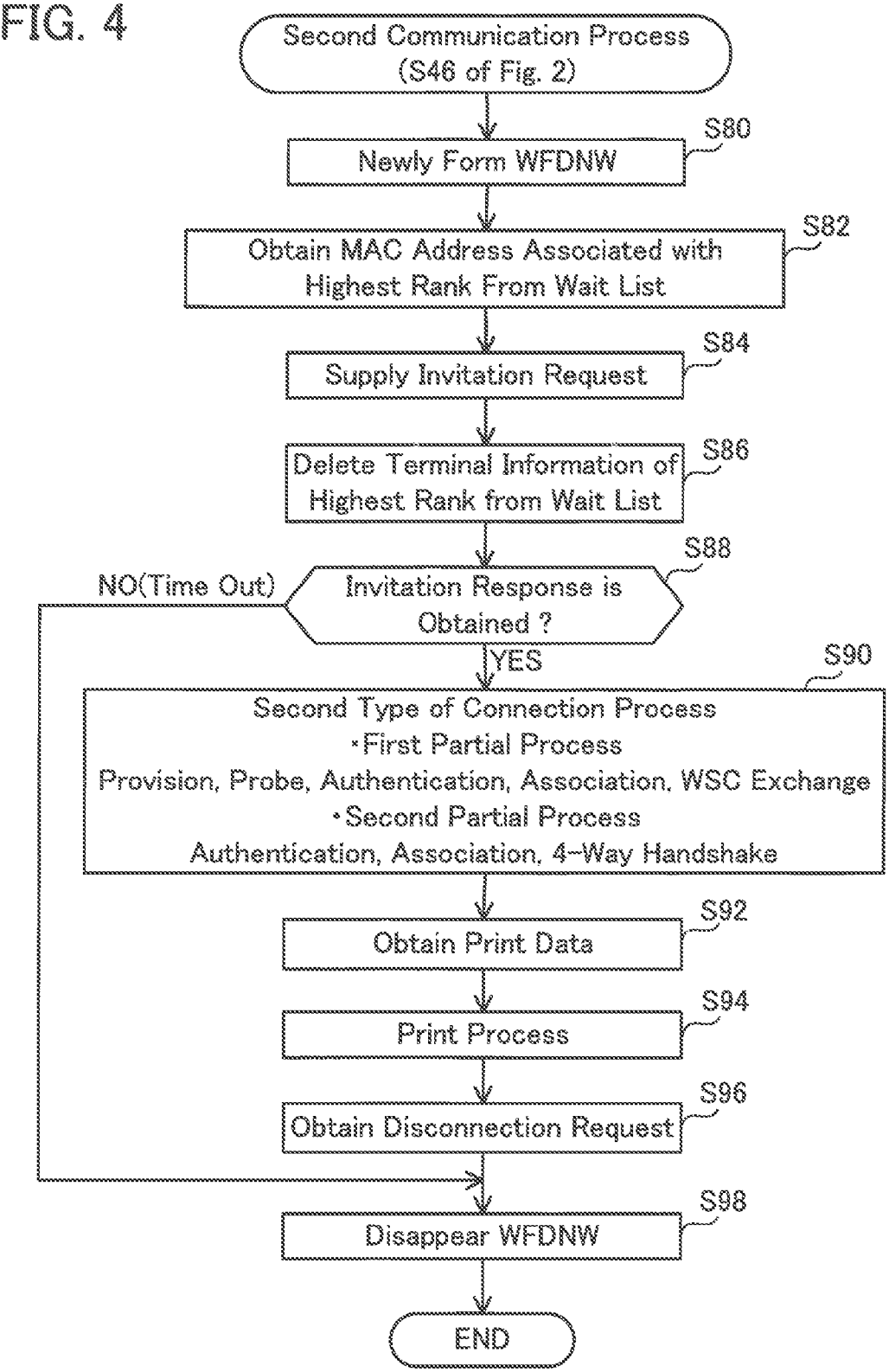
FIG. 4 illustrates a flowchart of a second communication process of the printer.

(Second Communication Process; FIG. 4)

Contents of the second communication process executed at S46 in FIG. 2 will be explained by referring to FIG. 4. At S80, the CPU 32 newly forms a WFDNW. Here, the method for forming the WFDNW is similar to that at S22 in FIG. 2.

The CPU 32 executes each of the following communication (S84, S90, S92 and the like) by using the MAC address (that is, MACx or MACy) corresponding to the WFDNW formed at S80 (hereinafter simply referred to as "WFDNW of S80") as the MAC address of the printer PR. That is, each signal supplied to the object terminal from the printer PR includes the MAC address corresponding to the WFDNW of S80 as the MAC address of a supply source.

At S82, the CPU 82 obtains the MAC address associated with the highest rank "1" from the wait list WL (see FIG. 1). As described above, if the terminal information of the object terminal is determined to be the highest rank in the wait list WL at S42 in FIG. 2 (YES at S42), the process in FIG. 4 is executed. Therefore, the MAC address obtained at S82 is the MAC address of the object terminal.

At S84, the CPU 32 supplies the Invitation Request which is a signal for instructing participation in the WFDNW of S80 via the wireless LAN I/F 20 to the object terminal. The Invitation Request includes the MAC address obtained at S82 as the MAC address of the supply destination. In this way, according to this embodiment, the printer PR can supply the Invitation Request, which is a trigger for the object terminal to participate in the WFDNW, to the object terminal immediately after the connection number changes to the number less than the upper limit. Thus, the printer PR can cause the object terminal to rapidly participate in the WFDNW.

At S86, the CPU 32 deletes the terminal information including the highest rank "1" from the wait list WL (see FIG. 1), That is, the CPU 32 deletes the terminal information of the object terminal from the wait list WL. If there are one or more pieces of terminal information including the ranks lower than that of the deleted terminal information in the wait list WL, the CPU 32 moves up each of the ranks included in the one or more pieces of terminal information.

At S88, the CPU 32 determines whether or not to obtain the Invitation Response from the object terminal. If the CPU 32 obtains the Invitation Response via the wireless LAN I/F 20 (YES at S88), the CPU 32 proceeds to S90.

At S90, the CPU 32 establishes the wireless connection with the object terminal by executing the second type of connection process with the object terminal via the wireless LAN I/F 20. The second type of connection process includes a first partial process and a second partial process. The first partial process is a process of supplying the wireless profile of the WFDNW of S80 to the object terminal. Under a situation in which S90 is executed, unlike the situation in which S70 in FIG. 3 is executed, the SSID and the password have not been supplied. yet from the printer PR to the object terminal. Therefore, at S90, the CPU 32 executes the first partial process so as to supply the wireless profile including the SSID and the password of the WFDNW of S80 to the object terminal. The second partial process is a process for establishing the wireless connection with the object terminal by using the wireless profile supplied in the first partial process.

In the first partial process, the CPU 32 obtains the Provision Discovery Request from the object terminal and supplies the Provision Discovery Response to the object terminal. The Provision Discovery Response includes information indicating the PBC (abbreviation of Push Button Configuration) method of the WPS. As a result, notification can be made to the object terminal that the PBC method of the WPS should be executed. Subsequently, the CPU 32 obtains the Probe Request from the object terminal and supplies the Probe Response to the object terminal. The Probe Response includes the SSID of the WFDNW of S80 and the predetermined authentication method and encryption method. As a result, notification can be made to the object terminal that each of these pieces of information should be used. The above predetermined authentication method and encryption method are an authentication method and an encryption method used temporarily to execute WSC Exchange, unlike the authentication method and encryption method used in the WFDNW of S80.

Subsequently, the CPU 32 sequentially obtains the Authentication Request and the Association Request from the object terminal and sequentially supplies the Authentication Response and the Association Response to the object terminal. As a result, preparation for execution of the WSC Exchange is completed. Then, the CPU 32 executes the WSC Exchange and supplies each information used in the WFDNW of S80 (that is, the authentication method, the encryption method, and the password) to the object terminal.

In the second partial process, the CPU 32 establishes the wireless connection with the object terminal by using the wireless profile of the WFDNW of S80 supplied in the first partial process. Specifically, the CPU 32 sequentially obtains the Authentication Request and the Association Request from the object terminal and sequentially supplies the Authentication Response and the Association Response to the object terminal. Then, the CPU 32 executes the 4-way handshake with the object terminal.

When the above second type of connection process is finished, the wireless connection with the object terminal is established. As a result, the CPU 32 can cause the object terminal to participate in the WFDNW of S80 as a child station (more specifically, as a CL apparatus). Then, the CPU 32 describes the MAC address of the object terminal included in each signal obtained in the second type of connection process in the managing list (that is, the managing list Lx or Ly in FIG. 1) stored at S80.

S92 to S98 are similar to S72 to S78 in FIG. 3. However, at S92, the CPU 32 obtains the print data from the object terminal by using the WFDNW of S80. Moreover, at S98, the CPU 32 deletes from the memory 34 the wireless profile and the managing list described in the memory 34 at S80 and causes the WFDNW of S80 to disappear. When S98 is finished, the process in FIG. 4 is finished.

In a case where the Invitation Response is not obtained even after a predetermined time has elapsed, since the Invitation Request was supplied at S84 (NO at S88), the CPU 32 skips S90 to S96 and proceeds to S98. The Invitation Response is not obtained, for example, if the object terminal moves to a position considerably away from the printer PR or if the user of the object terminal does not execute a connection permit operation in the object terminal in response to the Invitation Request.

Figure 5:
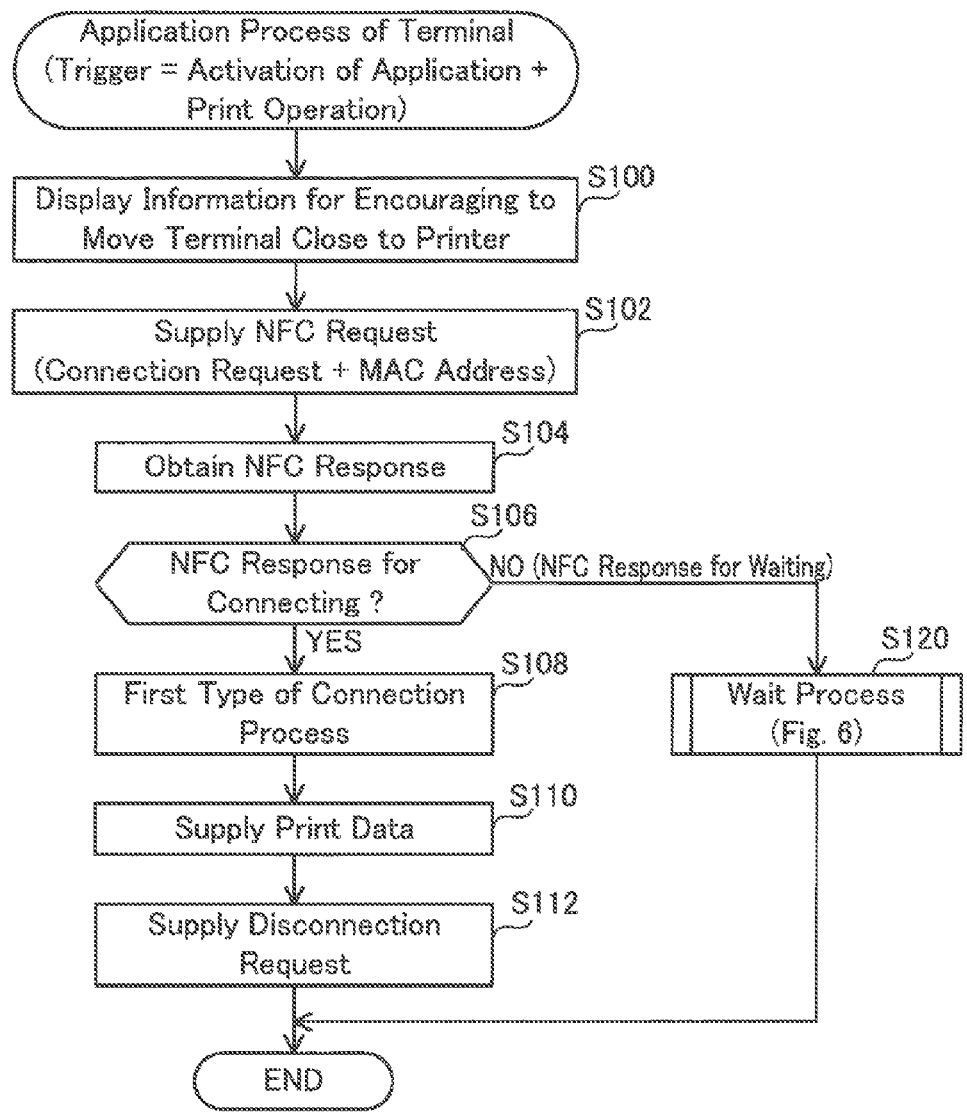
FIG. 5 illustrates a flowchart of an application process of a terminal.

(Application Process at Terminal; FIG. 5)

Contents of an application process executed by the CPU 92 of the terminal Ta will be explained by referring to FIG. 5. The other terminals Tb to Td also execute the application process similarly to the terminal Ta.

When an application activation operation and a printing operation are executed in the operating unit 72 by the user, the CPU 92 of the terminal Ta starts the process in FIG. 5 in accordance with the application 98. The application activation operation is an operation for activating the application 98 when the user wants to cause the printer PR to perform printing. The print operation is an operation by the user of designating print data representing an image to be printed from the memory 94 of the terminal Ta and instructing performance of printing.

At S100, the CPU 92 causes the display unit 74 to display a message to encourage the terminal Ta to be moved close to the printer PR. As a result, the user moves the terminal Ta close to the printer PR. As a result, the NEC connection is established between the NFC I/F 78 of the terminal Ta and the NFC I/F 18 of the printer PR.

At S102, the CPU 92 supplies, via the NFC I/F 78 to the printer PR, the NEC request including the connection request for the wireless connection via the wireless LAN 80 and MACa.

At S104, the CPU 92 obtains the NFC response from the printer PR via the NFC I/F 78. The NFC response is either of the NFC response including the SSID and the password at S24 in FIG. 2 (that is, the NFC response for connecting) and the NFC response including the reception ID and the rank at S32 (that is, the NFC response for waiting).

At S106, the CPU 92 determines whether the obtained NFC response is the NFC response for connecting or the NFC response for waiting. If the CPU 92 determines that the obtained NFC response is the NEC response for connecting (YES at S106), the CPU 92 proceeds to S108.

At S108, the CPU 92 executes the first type of connection process with the printer PR via the wireless LAN I/F 80, so as to establish the wireless connection with the printer PR. The operation executed by the CPU 92 at S108 is similar to the operation of the object terminal explained at S70 in FIG. 3. When the first type of connection process at S108 is finished, the wireless connection with the printer PR is established. As a result, the terminal Ta participates as a child station (more specifically, as a station) in the WFDNW in which the printer PR operates as the G/O apparatus (that is, the WFDNW of S22 in FIG. 2).

At S110, the CPU 92 supplies the print data designated by the user to the printer PR via the wireless LAN I/F 80 by using the WFDNW in which the CPU 92 participated at S108. When the CPU 92 completes supply of all the print data to the printer PR, the CPU 92 proceeds to S112.

At S112, the CPU 92 supplies the disconnection request to the printer PR via the wireless LAN I/F 80. As a result. the CPU 92 can disconnect the wireless connection with the printer PR. When S112 is finished, the process in FIG. 5 is finished.

On the other hand, if the CPU 92 determines at S106 that the obtained NFC response is the NFC response for waiting (NO at S106), the CPU 92 proceeds to S120 and executes a wait process which will be described later (see FIG. 6). When the wait process is finished, the process in FIG. 5 is finished.

(Wait Process; FIG. 6)

Contents of the wait process executed at S120 in FIG. 5 will be explained by referring to FIG. 6. At S130, the CPU 92 causes the display unit 74 to display a message and the rank included in the obtained NFC response for waiting. This message indicates that it should wait until when the situation is realized where the printer PR is capable of establishing the wireless connection with the terminal Ta. As a result, the user can know that the user should wait and also can know that on what rank the terminal Ta can establish the wireless connection with the printer PR. Subsequently, the CPU 92 sequentially executes the monitoring processes at S140, S150, and S160.

At S140, the CPU 92 monitors that a situation confirmation operation is executed by the user. If a button indicating "situation confirmation" is selected by the user, the CPU 92 determines that the situation confirmation operation is performed (YES at S140), so as to proceed to S142.

At S142, the CPU 92 causes the display unit 74 to display a message to encourage the terminal Ta to be moved close to the printer PR. As a result, the user moves the terminal Ta close to the printer PR, and the NFC connection is established between the terminal Ta and the printer PR.

At S144, the CPU 92 supplies, via the NFC I/F 78 to the printer PR, the NFC request including the reception ID included in the obtained NFC response for waiting and the situation confirmation request.

At S146, the CPU 92 obtains the NFC response (see S64 in FIG. 2) including the rank from the printer PR via the NFC I/F 78.

At S148, the CPU 92 causes the display unit 74 to display the rank included in the NFC response obtained at S146. As a result, the user can know on what rank the terminal Ta can establish the wireless connection with the printer PR. When S148 is finished, the CPU 92 returns to S140.

At S150, the CPU 92 monitors that a cancel operation is executed by the user. If a button indicating "cancel" is selected by the user, the CPU 92 determines that the cancel operation is executed (YES at S150), so as to proceed to S152.

At S152, the CPU 92 causes the display unit 74 to display a message to encourage the terminal Ta to be moved close to the printer PR. As a result, the user moves the terminal Ta close to the printer PR. As a result, the user moves the terminal Ta close to the printer PR. and thus, the NFC connection is established between the terminal Ta and the printer PR.

At S154, the CPU 92 supplies, via the NFC I/F 78 to the printer PR, the NFC request including the reception ID included in the obtained NFC response for waiting and the cancel request. As a result, the CPU 92 can cancel a plan of establishment of the wireless connection with the printer PR (see S52 in FIG. 2). When S154 is finished, the process in FIG. 6 is finished.

At S160, the CPU 92 monitors obtainment of the Invitation Request including MACa from the printer PR via the wireless LAN I/F 80, If the CPU 92 obtains the Invitation Request including MACa (YES at S160), the CPU 92 proceeds to S162.

At S162, the CPU 92 causes the display unit 74 to display a message for inquiring the user whether or not to establish the wireless connection with the printer PR. Then, the CPU 92 monitors execution of the connection permit operation by the user. If a button indicating "connection permit" is selected by the user, the CPU 92 determines that the connection permit operation is executed (YES at S162), so as to proceed to S164. If a button indicating "connection refusal" is selected by the user, the CPU 92 determines that the connection permit operation was not executed (NO at S162), so as to finish the process in FIG. 6.

At S164, the CPU 92 supplies the Invitation Response to the printer PR via the wireless LAN I/F 80.

At S166, the CPU 92 executes the second type of connection process with the printer PR, so as to establish a wireless connection with the printer PR via the wireless LAN I/F 80. The operation executed by the CPU 92 at S166 is similar to the operation of the object terminal explained at S90 in FIG. 4. When the second type of connection process at S166 is finished, the wireless connection with the printer PR is established. As a result, the terminal Ta can participate as a child station (more specifically, a CL apparatus) in the WFDNW (that is, the WFDNW formed at S80 in FIG. 4) in which the printer PR operates as the G/O apparatus.

At S158, the CPU 92 supplies the print data designated by the user to the printer PR via the wireless LAN I/F 80 by using the WFDNW in which the CPU 92 participated at S166. When the CPU 92 has supplied all the print data to the printer PR, the CPU 92 proceeds to S170.

At S170, the CPU 92 supplies the disconnection request to the printer PR via the wireless LAN I/F 80. As a result, the CPU 92 can disconnect the wireless connection with the printer PR. When S170 is finished, the process in FIG. 6 is finished.

(Specific Cases)

Subsequently, specific cases realized by the flowcharts in FIGS. 2 to 6 will be explained by referring to FIGS. 7 to 9. In FIGS. 7 to 9, arrows of broken lines between each of the apparatuses indicate the NFC communication, and arrows of solid lines indicate the Wi-Fi communication.

(Case A; FIG. 7)

A state in which the printer PR sequentially establishes the wireless connection with two terminals Ta and Tb will be explained by referring to FIG. 7. In an initial state in FIG. 7, the connection number of the printer PR is zero.

At T10, the user of the terminal Ta executes the application activation operation and the printing operation to the terminal Ta (trigger for starting the process in FIG. 5) and moves the terminal Ta close to the printer PR. In this case, at T20, the terminal Ta supplies the NFC request including the connection request and MACa to the printer PR (S102 in FIG. 5).

At T20, in a case where the NFC request including the connection request is obtained from the terminal Ta (trigger for starting the process in FIG. 2), the printer PR determines that the connection number of the printer PR has not reached the upper limit (NO at S20 in FIG. 2). In this case, at T22, the printer PR newly forms a first WFDNW corresponding to MACx (S22). Here, the printer PR generates an SSID "aaa" and a password "Pa". Then, at T24, the printer PR supplies the NFC response for connecting including the SSID "aaa" and the password "Pa" to the terminal Ta (S24).

Subsequently, at T26, the printer PR and the terminal Ta execute the first type of connection process and establish the wireless connection (S70 in FIG. 3, S108 in FIG. 5). As a result, the terminal Ta participates as a child station in the first WFDNW in which the printer PR operates as the G/O apparatus.

At T28, the printer PR obtains the print data from the terminal Ta by using the first WFDNW (S72 in FIG. 3). If the data size of the print data is relatively large, for example, a long time is required for communication of the print data. In this case, the wireless connection between the printer PR and the terminal Ta is maintained for a long time. In the case A, in a state where the wireless connection is maintained between the printer PR and the terminal Ta, that is, in a state where the first WFDNW is maintained, the NFC request including the connection request is supplied from the terminal Tb to the printer PR as will be explained later.

At T30, the user of the terminal Tb executes the application activation operation and the printing operation to the terminal Tb (trigger for starting the process in FIG. 5) and moves the terminal Tb close to the printer PR. In this case, at T40, the terminal Tb supplies the NFC request including the connection request and MACb to the printer PR (S102 in FIG. 5).

At T40, in a case where the NFC request including the connection request is obtained from the terminal Tb (trigger for starting the process in FIG. 2), the printer PR determines that the connection number of the printer PR has not reached the upper limit (NO at S20 in FIG. 2). In this case, at T42, the printer PR newly limns a second WFDNW corresponding to MACy (S22). Here, the printer PR generates an SSID "bbb" different from the SSID "aaa" of the first WFDNW and further generates a password "Pb". Then, at T44, the printer PR supplies the NFC response for connecting including the SSID "bbb" and the password "Pb" to the terminal Tb (S24).

Subsequently, at T46, the printer PR and the terminal Tb execute the first type of connection process and establish the wireless connection (S70 in FIG. 3, S108 in FIG. 5). As a result, the terminal Tb participates as a child station in the second WFDNW in which the printer PR operates as the G/O apparatus.

At T48, the printer PR obtains the print data from the terminal Tb by using the second WFDNW (S72 in FIG. 3).

(Effect of Case A)

The printer PR determines that the connection number has not reached the upper limit in the case where the NFC request including the connection request is obtained from the terminal Ta. In this case, the printer PR forms the first WFDNW so as to establish the wireless connection with the terminal Ta. As a result, the terminal Ta operates as a child station of the first WFDNW. Moreover, in the case where the NFC request including the connection request is obtained from the terminal Tb in the state of the first WFDNW being formed, the printer PR determines that the connection number has not reached the upper limit. In this case, while the state in which the first WFDNW is formed is maintained, the printer PR newly forms the second WFDNW different from the first WFDNW so as to establish the wireless connection with the terminal Tb. As a result, the terminal Tb operates as the child station of the second WFDNW. As described above, the printer PR can construct the state in which both the first and second WFDNW in Which the printer PR itself operates as the G/O apparatus are present at the same time. Thus, the printer PR. can obtain the print data from the terminal Ta by using the first WFDNW and can obtain the print data from the terminal Tb by using the second WFDNW. The printer PR can perform the wireless communication with the plurality of terminals Ta and Tb by using the new method.

Assume that the printer PR employs a method of forming only one WFDNW and establishing a wireless connection with a plurality of terminals matching the upper limit. According to this method, a situation in which each of the plurality of terminals participates in the one WFDNW as a child station at the same time can be constructed. In the state where the plurality of child stations belong to the same WFDNW as described above, a communication using the WFDNW may be performed among the child stations. Therefore, a first child station may make an improper access to information stored in a second child station, for example. That is, in the state where the plurality of child stations belongs to the same WFDNW, a security problem may occur. In general, the larger the number of the child stations belonging to the same WFDNW becomes, the lower the security may become.

On the other hand, in the method of this embodiment, as illustrated in the case A, the printer PR causes the terminal Ta to participate in the first WFDNW as the child station and causes the terminal Tb to participate in the second WFDNW different from the first WFDNW as the child station. That is, the situation does not occur in which the plurality of child stations matching the upper limit belongs to the same WFDNW at the same time, and as a result, security can be improved. Particularly, in this embodiment, the maximum number of the child station capable of belonging to the first WFDNW and the maximum number of the child station capable of belonging to the second WFDNW are both "1". Thus, since two or more child stations cannot belong to one WFDNW formed by the printer PR, security can be further improved.

(Case B; FIG. 8)

Fig, 8 illustrates a sequence chart continued from FIG. 7. In the initial state in FIG. 8, the printer PR establishes both the wireless connection with the terminal Ta and the wireless connection with the terminal Tb. That is, the connection number of the printer PR has reached the upper limit.

At T50, the user of the terminal Tc executes the application activation operation and the printing operation to the terminal Tc (trigger for starting the process in FIG. 5) and moves the terminal Tc close to the printer PR. In this case, at T60, the terminal Tc supplies the NFC request including the connection request and MACc to the printer PR (S102 in FIG. 5).

At T60, in a case where the NFC request including the connection request is obtained from the terminal Tc (trigger for starting the process in FIG. 2), the printer PR. determines that the connection number of the printer PR has reached the upper limit (YES at S20 in FIG. 2). In this case, the printer PR describes the terminal information including the rank "1", the reception ID "001", and MACc in the wait list WL (S30). Then, at T62, the printer PR supplies the NFC response for waiting including the rank "1" and the reception ID "001" to the terminal Tc (S32).

At T52, the terminal Tc displays the rank "1" included in the NFC response for waiting obtained from the printer PR (S130 in FIG. 6). As a result, the user of the terminal Tc can know that the terminal Tc has the first connection rank.

After that, at T70, the user of the terminal Td executes the application activation operation and the printing operation to the terminal Td (trigger for starting the process in FIG. 5) and moves the terminal Td close to the printer PR. In this case, at T80, the terminal Td supplies the NFC request including the connection request and MACd to the printer PR (S102 in FIG. 5).

At T80, in a case where the NFC request including the connection request is obtained from the terminal Td (trigger for starting the process in FIG. 2), the printer PR determines that the connection number of the printer PR has reached the upper limit (YES at S20 in FIG. 2). In this case, the printer PR describes the terminal information including the rank "2", the reception ID "002", and MACd in the wait list WL (S30). Then, at T82, the printer PR supplies the NFC response for waiting including the rank "2" and the reception ID "002" to the terminal Td (S32).

At T82, the terminal Td displays the rank "2" included in the NFC response for waiting obtained from the printer PR (S130 in FIG. 6). As a result, the user of the terminal Td can know that the terminal Td has the second connection rank.

After that, at T90, the printer PR obtains a disconnection request from the terminal Ta (S76 in FIG. 3). In this case, at T100, the printer PR disconnects the wireless connection with the terminal Ta so as to cause the first WFDNW to disappear (S78). As a result, the connection number of the printer PR becomes less than the upper limit. Then, at T102, the printer PR newly forms a third WFDNW corresponding to MACx (S80 in FIG. 4). Here, the printer PR generates an SSID "ccc" different from each of the SSID of the first and second WFDNW and further generates a password "Pc".

Subsequently, at T104, the printer PR obtains MACc of the terminal Tc associated with the highest rank "1" from the wait list WL (S82) and supplies the Invitation Request including MACc to the terminal Tc (S84). Then, the printer PR deletes the terminal information of the terminal Tc from the wait list WL (S86). As a result, a state where only the terminal information. of the terminal Td is described in the wait list WL is realized.

At T106, the user of the terminal Tc executes the connection permit operation to the terminal Tc (YES at S162 in FIG. 6). In this case, at T108, the terminal Tc supplies the Invitation Response to the printer PR (S164).

At T110, the printer PR and the terminal Tc execute the second type of connection process so as to establish the wireless connection (S90 in FIG. 4, S166 in FIG. 6). As a result, the terminal Tc participates as a child station in the third WFDNW in which the printer PR operates as the G/O apparatus.

At T112, the printer PR obtains the print data from the terminal Tc by using the third WFDNW (S92 in FIG. 4).

At T120, the user of the terminal Td executes the situation confirmation operation to the terminal Td (YES at S140 in FIG. 6) and moves the terminal Td close to the printer PR. In this case, at T122, the terminal Td supplies the NFC request including the situation confirmation request and the reception ID "002" to the printer PR (S144 in FIG. 6).

At T122, in a case where the NFC request including the situation continuation request and the reception ID "002" are obtained from the terminal Td (YES at S60 in FIG. 2), the printer PR obtains the rank "1" associated with the reception ID "002" from the wait list WL (S62). Then, at T124, the printer PR supplies the NFC response including the rank "1" to the terminal Td (S64).

At T126, the terminal Td displays the rank "1" included in the NFC response Obtained from the printer PR (S148 in FIG. 6). As a result, the user of the terminal. Td can know that the connection rank of the terminal Td has moved up from the second to the first.

(Effect of Case B)

In a case where the NFC request including the connection request is obtained from the terminal Tc in the state of the connection number reaching the upper limit, the printer PR supplies the NFC response for waiting to the terminal Tc. As a result, the terminal Tc can be made to wait for a situation where the printer PR is capable of establishing the wireless connection with the terminal Tc. Then, if the wireless connection with the terminal Ta in which the printer PR operates as the child station of the first WFDNW is disconnected and the connection number becomes less than the upper limit, the printer PR newly forms the third WFDNW and supplies the Invitation Request including MACc to the terminal Tc. As a result, the printer PR can establish the wireless connection with the terminal Tc and can obtain the print data from the terminal Tc by using the third WFDNW. That is, in the case where the NFC request including the connection request is obtained from the terminal Tc in the state of the connection number reaching the upper limit, the printer PR can appropriately perform the wireless communication with the terminal Tc.

Moreover, when the wireless connection with the terminal Ta is disconnected, the printer PR establishes the wireless connection with the terminal Tc on a priority basis which has supplied the NFC request including the connection request earlier than the terminal Td. Thus, the terminal Tc does not have to be made to wait for a long time.

(Case C; FIG. 9)

FIG. 9 illustrates a sequence chart continued from FIGS. 7. T50 to T82 in Fig, 9 are similar to T50 to T82 in FIG. 8.

At T130, the user of the terminal Tc executes the cancel operation to the terminal Tc (YES at S150 in FIG. 6) and moves the terminal Tc close to the printer PR. In this case, at T132, the terminal Tc supplies the NFC request including the cancel request and the reception ID "001" to the printer PR (S154 in FIG. 6).

At T132, in a case where the NFC request including the cancel request and the reception ID "001" are obtained from the terminal Tc (YES at S50 in FIG. 2), the printer PR deletes the terminal information of the terminal Tc including the reception ID "001" from the wait list WL (S52). As a result, the state in Which only the terminal information of the terminal Td is described in the wait list WL is realized.

After that, at T140, the user of the terminal Td executes the situation confirmation operation to the terminal Td (YES at S140 in FIG. 6) and moves the terminal Td close to the printer PR. In this case, at T142, the terminal Td supplies the NFC request including the situation confirmation request and the reception ID "002" to the printer PR (S144 in FIG. 6).

At T142, in a case where the NFC request including the situation continuation request and the reception ID "002" are obtained from the terminal Td (YES at S60 in FIG. 2), the printer PR obtains the rank "1" associated with the reception ID "002" from the wait list WL (S62). Then, at T144, the printer PR supplies the NFC response including the rank "1" to the terminal Td (S64).

At T146, the terminal Td displays the rank "1" included in the NFC response obtained from the printer PR (S148 in FIG. 6). As a result, the user of the terminal Td can know that the connection rank of the terminal Td moves up from the second to the first.

T90 to T102 are similar to T90 to T102 in FIG. 8. At T164, the printer PR obtains MACd of the terminal Td associated with the highest rank "1" from the wait list WL (S82) and supplies the Invitation Request including MACd to the terminal Td (S84). Then, the printer PR deletes the terminal information of the terminal Td from the wait list WL (S86).

As a result, the state in which no terminal information is described in the wait list WL, that is, the state in which no terminal is waiting is realized.

At T166, the user the user of the terminal Td executes the connection permit operation to the terminal Td (YES at S162 in FIG. 6). In this case, at T168, the terminal Td supplies the Invitation Response to the printer PR (S164).

At T170, the printer PR and the terminal Td execute the second type of connection process and establish the wireless connection (S90 in FIG. 4, S166 in FIG. 6). As a result, the terminal Td participates as a child station in the third WFDNW in which the printer PR operates as the G/O apparatus.

At T172, the printer PR obtains the print data from the terminal Td by using the third WFDNW (S92 in FIG. 4).

(Effect of Case C)

In the case C, in the case where the NFC request including the connection request is obtained from the terminal Td in the state of the connection number reaching the upper limit, the printer PR can appropriately perform the wireless communication with the terminal Td. Moreover, in the case where the cancel request is obtained from the terminal Tc, the printer PR can cancel a plan of establishment of the wireless connection with the terminal Tc by deleting the terminal information of the terminal Tc from the wait list WL. Thus, when the wireless connection with the terminal Ta is disconnected, the printer PR can appropriately establish the wireless connection with the terminal Td.

Moreover, in this embodiment, not only the rank and the MAC address but the unique reception ID is described in the wait list WL. Thus, the following effect can be obtained. For example, assume a situation where the printer PR sequentially obtains the NFC request including the connection request from the terminal Tc twice and sequentially supplies the NFC response for waiting to the terminal Tc twice. In this case, two pieces of terminal information including the same MAC address (that is, MACc) are sequentially described in the wait list WL. The above two pieces of terminal information include unique reception IDs, respectively. Therefore, in a case where the NFC request including the cancel request or the situation confirmation request is obtained from the terminal Tc, the printer PR can discriminate to which of the two pieces of terminal information the NFC request is a target based on the reception ID included in the NFC request.

(Correspondence)

The printer PR, the wireless LAN I/F 20, and the NFC I/F 18 are examples of the "communication apparatus", the "first interface", and the "second interface", respectively. In the case B in FIG. 8, the terminal Ta, the terminal Tc, and the terminal Td are examples of the "specific external apparatus", the "first external apparatus", and the "second external apparatus", respectively. The NFC request at T60 and the NFC request at T80 are examples of the "first wireless connection request" and the "second wireless connection request", respectively, The NFC response for waiting at T62 and the NFC response for waiting at T82 are examples of the "first wait information" and the "second wait information", respectively. The first WFDNW and the third WFDNW are examples of the "first wireless network" and the "second wireless network", respectively. The Invitation Request at T104 is an example of "instruction information" for instructing to participate as a child station.

In another aspect, in the case B in FIG. 8, the terminal Td and the NFC request at T80 are examples of the "first external apparatus" and the "first wireless connection request", respectively. In this case, the NFC response for waiting at T82 and the NFC request at T122 are examples of the "first wait information" and the "first inquiry", respectively. The rank "2" included in the NFC response for waiting at 182 and the rank "1" included in the NFC response at T124 are examples of the "first number information" and the "second number information", respectively.

In the case A in FIG. 7, the terminal Tb and the NFC request at T40 are examples of the "first external apparatus" and the "first wireless connection request", respectively. In this case, the first WFDNW and the second WFDNW are examples of the "first wireless network" and the "third wireless network", respectively.

In the case C in FIG. 9, the terminal Td and the NFC request at T80 are examples of the "first external apparatus" and the "first wireless connection request", respectively. In this case, the NFC response for waiting at T82, the NFC request at T132, and the NFC request at T142 are examples of the "first wait information", the "cancel request", and the "second inquiry", respectively. The rank "2" included in the NFC response for waiting at T82 and the rank "1" included in the NFC response at T144 are examples of the "first number information" and the "third number information", respectively.

(Variation 1)

The upper limit that the printer PR is capable of establishing a wireless connection does not have to be "2" and may be "1" or "3" or more. The following variation 1-1 or 1-2 may be employed, for example.

(Variation 1-1)

For example, if the upper limit is "1", the printer PR forms a first WFDNW so as to establish a wireless connection with the terminal Ta and then, in a case where a NFC request including a connection request is obtained from the terminal Tb, the printer PR determines that the connection number has reached the upper limit. In this case, the printer PR supplies a NFC response for waiting to the terminal Tb. Then, in a case where the wireless connection with the terminal Ta is disconnected, the printer PR newly forms a second WFDNW different from the first WFDNW so as to establish a wireless connection with the terminal Tb. In this variation, the terminal Ta and the terminal Tb are examples of the "specific external apparatus" and the "first external apparatus", respectively.

(Variation 1-2)

If the upper limit is "4", for example, the printer PR may construct a situation where two WFDNWs in which the printer PR itself operates as the G/O apparatus are present at the same time. Then, in each of the two WFDNWs, the maximum number of child stations may be "2". For example, assume a situation where the printer PR establishes a wireless connection with each of the two terminals Ta and Tb operating as child stations of a first WFDNW and establishes a wireless connection with each of the two terminals Tc and Td operating as child stations of the second WFDNW. In such a situation, in a case where a NFC request including a connection request is obtained from a specific terminal, not shown, the printer PR determines that the connection number has reached the upper limit. In this case, the printer PR supplies a NFC response for waiting to the specific terminal. Then, in a case where the wireless connection with the terminal Ta is disconnected and then, the wireless connection with the terminal Tb is disconnected, for example, the printer PR causes the first WFDNW to disappear. Subsequently, the printer PR newly forms a third WFDNW different from the first and second WFDNWs so as to establish a wireless connection with the specific terminal. In this variation, the terminal Tb and the specific terminal are examples of the "specific external apparatus" and the "first external apparatus", respectively. In a wireless network in which a communication apparatus operates as a parent station as in this variation, the maximum number of the child station may be "2" or more.

(Variation 2)

The printer PR may comprise a specific I/F for other types of wireless communication such as Bluetooth (registered trademark), Transfer Jet (registered trademark), infrared rays and the like, instead of comprising the NFC I/F 18. Then, the printer PR may obtain a wireless connection request from a terminal via the above-described specific I/F. Moreover, the printer PR may obtain a wireless connection request (Association Request, for example) from a terminal via the wireless LAN I/F 20, for example. That is, a communication apparatus may obtain a wireless connection request from an external apparatus by using any types of I/F. Similarly, a communication apparatus may supply wait information to an external apparatus by using any types of I/F.

(Variation 3)

The CPU 32 may activate so-called SoftAP so as to operate the printer PR as a pseudo AP, instead of operating as a G/O apparatus of the WFD method. In this variation, also, the CPU 32 can form a wireless network in which the printer PR operates as a parent station.

(Variation 4)

The "communication apparatus" is not limited to the printer PR and may be other types of apparatus (a scanner, a facsimile machine, a telephone, a multi-function machine, a wireless access point, a PC, a mobile terminal and the like, for example). Generally speaking, the "communication apparatus" may be any types of apparatuses as long as it operates as a parent station of a wireless network and is an apparatus capable of establishing a wireless connection with an external apparatus.

(Variation 5)

In the above embodiment, the CPU 32 of the printer PR executes the program 36 (that is, software) in the memory 34 so that each process in FIGS. 2 to 4 is realized. Instead of that, at least one of the processes in FIGS. 2 to 4 may be realized by hardware such as a logical circuit and the like.

What is claimed is:

1. A communication apparatus comprising:
   a processor; and
   a memory storing computer-readable instructions therein, the computer-readable instructions, when executed by the processor, causing the communication apparatus to:
   obtain a first wireless connection request including a MAC address of a first external apparatus from the first external apparatus in a state where a first wireless network to which both the communication apparatus and a specific external apparatus belong is formed, the first wireless network being identified by a first SSID, wherein in the first wireless network, the communication apparatus is configured to operate as a parent station and the specific external apparatus is configured to operate as a child station;
   determine whether a connection number has reached an upper limit in a case where the first wireless connection request including the MAC address of the first external apparatus is obtained from the first external apparatus in the state where the first wireless network is formed, the connection number being a total number of a wireless connection which has been currently established by the communication apparatus;

supply first wait information to the first external apparatus in a case where the first wireless connection request including the MAC address of the first external apparatus is obtained from the first external apparatus in the state where the first wireless network is formed and it is determined that the connection number has reached the upper limit, the first wait information being for causing the first external apparatus to wait until when a situation is realized where the communication apparatus is capable of establishing a wireless connection with the first external apparatus;

newly form a second wireless network which is different from the first wireless network to which both the communication apparatus and the specific external apparatus had belonged, in a case where a wireless connection between the communication apparatus and the specific external apparatus is disconnected after the first wait information is supplied to the first external apparatus, the second wireless network being a wireless network in which the communication apparatus operates as a parent station and being identified by a second SSID different from the first SSID; and supply instruction information including the MAC address of the first external apparatus to the first external apparatus after the second wireless network in which the communication apparatus operates as the parent station is formed, so as to establish a wireless connection with the first external apparatus, the instruction information being for instructing the first external apparatus to participate in the second wireless network as the child station, wherein as a result of the wireless connection with the first external apparatus being established, the second wireless, network in which the communication apparatus is configured to operate as the parent station and the first external apparatus is configured to operate as a child station is formed.

2. The communication apparatus as in claim 1, further comprising:
a first interface,
wherein the connection number is a total number of a wireless connection which has been currently established via the first interface by the communication apparatus, and
the wireless connection with the first external apparatus is established via the first interface.

3. The communication apparatus as in claim 1, further comprising:
a second interface,
wherein the first wireless connection request is obtained via the second interface, and
the first wait information is supplied via the second interface.

4. The communication apparatus as in claim 1, wherein the computer-readable instructions, when executed by the processor, further cause the communication apparatus to:
newly form a third wireless network so as to establish a wireless connection with the first external apparatus, in a case where the first wireless connection request is obtained from the first external apparatus and it is determined that the connection number has not reached the upper limit, wherein in the third wireless network, the communication apparatus is configured to operate as a parent station and the first external apparatus is configured to operate as a child station.

5. The communication apparatus as in claim 4, wherein the third wireless network is newly formed while maintaining the state where the first wireless network is being formed, in the case where the first wireless connection request is obtained from the first external apparatus and it is determined that the connection number has not reached the upper limit.

6. The communication apparatus as in claim 1, wherein the computer-readable instructions, when executed by the processor, further cause the communication apparatus to:
obtain a second wireless connection request from a second external apparatus after the first wait information is supplied to the first external apparatus and before the wireless connection between the communication apparatus and the specific external apparatus is disconnected;
determine that the connection number has reached the upper limit in a case where the second wireless connection request is obtained from the second external apparatus; and
supply second wait information to the second external apparatus in a case where the second wireless connection request is obtained from the second external apparatus and it is determined that the connection number has reached the upper limit, the second wait information being for causing the second external apparatus to wait until when a situation is realized where the communication apparatus is capable of establishing a wireless connection with the second external apparatus,
wherein in a case where the first wait information is supplied to the first external apparatus, then the second wait information is supplied to the second external apparatus, and then the wireless connection between the communication apparatus and the specific external apparatus is disconnected, the wireless connection with the first external apparatus, that has supplied the wireless connection request to the communication apparatus earlier than the second external apparatus, is established on a priority basis.

7. The communication apparatus as in claim 1, wherein the first wait information includes first number information related to a current total number of a wait apparatus which is waiting until when a situation is realized where the communication apparatus is capable of establishing a wireless connection with the wait apparatus.

8. The communication apparatus as in claim 7, wherein the computer-readable instructions, when executed by the processor, further cause the communication apparatus to:
obtain a first inquiry related to a total number of the wait apparatus from the first external apparatus, after the first wait information including the first number information is supplied to the first external apparatus and then a wireless connection with at least one wait apparatus is established; and
supply second number information related to a current total number of the wait apparatus to the first external apparatus in a case where the first inquiry is obtained from the first external apparatus, the second number information indicating that the current total number of the wait apparatus is less than the first number information.

9. The communication apparatus as in claim 7, wherein the computer-readable instructions, when executed by the processor, further cause the communication apparatus to:
  obtain a second inquiry related to a total number of the wait apparatus from the first external apparatus, after the first wait information including the first number information is supplied to the first external apparatus and then a cancel request is obtained from at least one wait apparatus, the cancel request being for cancelling a plan of an establishment of a wireless connection between the communication apparatus and the wait apparatus; and
  supply third number information related to a current total number of the wait apparatus to the first external apparatus in a case where the second inquiry is obtained from the first external apparatus, the third number information indicating that the current total number of the wait apparatus is less than the first number information.

10. A non-transitory computer-readable medium storing computer-readable instructions for a communication apparatus, wherein the computer-readable instructions, when executed by a processor mounted on the communication apparatus, cause the communication apparatus to:
  obtain a first wireless connection request including a MAC address of a first external apparatus from the first external apparatus in a state where a first wireless network to which both the communication apparatus and a specific external apparatus belong is formed, the first wireless network being identified by a first SSID, wherein in the first wireless network, the communication apparatus is configured to operate as a parent station and the specific external apparatus is configured to operate as a child station;
  determine whether a connection number has reached an upper limit in a case where the first wireless connection request including the MAC address of the first external apparatus is obtained from the first external apparatus in the state where the first wireless network is formed, the connection number being a total number of a wireless connection which has been currently established by the communication apparatus;
  supply first wait information to the first external apparatus in a case where the first wireless connection request including the MAC address of the first external apparatus is obtained from the first external apparatus in the state where the first wireless network is formed and it is determined that the connection number has reached the upper limit, the first wait information being for causing the first external apparatus to wait until when a situation is realized where the communication apparatus is capable of establishing a wireless connection with the first external apparatus;
  newly form a second wireless network which is different from the first wireless network to which both the communication apparatus and the specific external apparatus had belonged, in a case where a wireless connection between the communication apparatus and the specific external apparatus is disconnected after the first wait information is supplied to the first external apparatus, the second wireless network being a wireless network in which the communication apparatus operates as a parent station and being identified by a second SSID different from the first SSID; and
  supply instruction information including the MAC address of the first external apparatus to the first external apparatus after the second wireless network in which the communication apparatus operates as the parent station is formed, so as to establish a wireless connection with the first external apparatus, the instruction information being for instructing the first external apparatus to participate in the second wireless network as the child station, wherein as a result of the wireless connection with the first external apparatus being established, the second wireless network in which the communication apparatus is configured to operate as the parent station and the first external apparatus is configured to operate as a child station is formed.

11. The non-transitory computer-readable medium as in claim 10, wherein
  the connection number is a total number of a wireless connection which has been currently established via a first interface of the communication apparatus by the communication apparatus, and
  the wireless connection with the first external apparatus is established via the first interface.

12. The non-transitory computer-readable medium as in claim 10, wherein
  the first wireless connection request is obtained via a second interface of the communication apparatus, and
  the first wait information is supplied via the second interface.

13. The non-transitory computer-readable medium as in claim 10, wherein the computer-readable instructions, when executed by the processor, further cause the communication apparatus to:
  newly form a third wireless network so as to establish a wireless connection with the first external apparatus, in a case where the first wireless connection request is obtained from the first external apparatus and it is determined that the connection number has not reached the upper limit,
  wherein in the third wireless network, the communication apparatus is configured to operate as a parent station and the first external apparatus is configured to operate as a child station.

14. The non-transitory computer-readable medium as in claim 13, wherein
  the third wireless network is newly formed while maintaining the state where the first wireless network is being formed, in the case where the first wireless connection request is obtained from the first external apparatus and it is determined that the connection number has not reached the upper limit.

15. The non-transitory computer-readable medium as in claim 10, wherein the computer-readable instructions, when executed by the processor, further cause the communication apparatus to:
  obtain a second wireless connection request from a second external apparatus after the first wait information is supplied to the first external apparatus and before the wireless connection between the communication apparatus and the specific external apparatus is disconnected;
  determine that the connection number has reached the upper limit in a case where the second wireless connection request is obtained from the second external apparatus; and
  supply second wait information to the second external apparatus in a case where the second wireless connection request is obtained from the second external apparatus and it is determined that the connection number has reached the upper limit, the second wait information being for causing the second external apparatus to wait until when a situation is realized where the communication apparatus is capable of establishing a wireless connection with the second external apparatus, wherein in a case where the first wait information is supplied to the first external apparatus, then the second wait information is supplied to the second external apparatus, and then the wireless connection between the communication apparatus and the specific external apparatus is disconnected, the wireless connection with the first external apparatus, that has supplied the wireless connection request to the communication apparatus earlier than the second external apparatus, is established on a priority basis.

16. The non-transitory computer-readable medium as in claim 10, wherein the first wait information includes first number information related to a current total number of a wait apparatus which is waiting until when a situation is realized where the communication apparatus is capable of establishing a wireless connection with the wait apparatus.

17. The non-transitory computer-readable medium as in claim 16, wherein the computer-readable instructions, when executed by the processor, further cause the communication apparatus to:

obtain a first inquiry related to a total number of the wait apparatus from the first external apparatus, after the first wait information including the first number information is supplied to the first external apparatus and then a wireless connection with at least one wait apparatus is established; and supply second number information related to a current total number of the wait apparatus to the first external apparatus in a case where the first inquiry is obtained from the first external apparatus, the second number information indicating that the current total number of the wait apparatus is less than the first number information.

18. The non-transitory computer-readable medium as in claim 16, wherein the computer-readable instructions, when executed by the processor, further cause the communication apparatus to:

obtain a second inquiry related to a total number of the wait apparatus from the first external apparatus, after the first wait information including the first number information is supplied to the first external apparatus and then a cancel request is obtained from at least one wait apparatus, the cancel request being for cancelling a plan of an establishment of a wireless connection between the communication apparatus and the wait apparatus; and supply third number information related to a current total number of the wait apparatus to the first external apparatus in a case where the second inquiry is obtained from the first external apparatus, the third number information indicating that the current total number of the wait apparatus is less than the first number information.

19. A method performed by a communication apparatus, the method comprising:

obtaining a first wireless connection request including a MAC address of a first external apparatus from the first external apparatus in a state where a first wireless network to which both the communication apparatus and a specific external apparatus belong is formed, the first wireless network being identified by a first SSID, wherein in the first wireless network, the communication apparatus is configured to operate as a parent station and the specific external apparatus is configured to operate as a child station;

determining whether a connection number has reached an upper limit in a case where the first wireless connection request including the MAC address of the first external apparatus is obtained from the first external apparatus in the state where the first wireless network is formed, the connection number being a total number of a wireless connection which has been currently established by the communication apparatus;

supplying first wait information to the first external apparatus in a case where the first wireless connection request including the MAC address of the first external apparatus is obtained from the first external apparatus in the state where the first wireless network is formed and it is determined that the connection number has reached the upper limit, the first wait information being for causing the first external apparatus to wait until when a situation is realized where the communication apparatus is capable of establishing a wireless connection with the first external apparatus;

newly forming a second wireless network which is different from the first wireless network to which both the communication apparatus and the specific external apparatus had belonged, in a case where a wireless connection between the communication apparatus and the specific external apparatus is disconnected after the first wait information is supplied to the first external apparatus, the second wireless network being a wireless network in which the communication apparatus operates as a parent station and being identified by a second SSID different from the first SSID; and supplying instruction information including the MAC address of the first external apparatus to the first external apparatus after the second wireless network in which the communication apparatus operates as the parent station is formed, so as to establish a wireless connection with the first external apparatus, the instruction information being for instructing the first external apparatus to participate in the second wireless network as the child station, wherein as a result of the wireless connection with the first external apparatus being established, the second wireless, network in which the communication apparatus is configured to operate as the parent station and the first external apparatus is configured to operate as a child station is formed.

* * * * *